(12) United States Patent
Wild

(10) Patent No.: US 11,115,731 B1
(45) Date of Patent: Sep. 7, 2021

(54) WIRELESS TRANSMITTER/RECEIVER ARCHITECTURE FOR LOW-POWER WIDE AREA NETWORKS

(71) Applicant: Amazon Technologies, Inc., Seattle, WA (US)

(72) Inventor: Benjamin Wild, Marina Del Rey, CA (US)

(73) Assignee: Amazon Technologies, Inc., Seattle, WA (US)

(*) Notice: Subject to any disclaimer, the term of this patent is extended or adjusted under 35 U.S.C. 154(b) by 0 days.

(21) Appl. No.: 16/872,993

(22) Filed: May 12, 2020

(51) Int. Cl.
*H04Q 1/457* (2006.01)
*H04J 13/00* (2011.01)
*H04B 1/707* (2011.01)
*H04Q 1/46* (2006.01)
*H04L 27/26* (2006.01)

(52) U.S. Cl.
CPC ............ *H04Q 1/4575* (2013.01); *H04B 1/707* (2013.01); *H04J 13/0022* (2013.01); *H04Q 1/46* (2013.01); *H04L 27/2657* (2013.01)

(58) Field of Classification Search
CPC ............. H04L 27/2657; H04L 27/2659; H04L 27/2675; H04L 27/2647; H03M 13/00; H04H 40/18; H04Q 1/4575

USPC .......................................................... 375/150
See application file for complete search history.

(56) References Cited

U.S. PATENT DOCUMENTS

2008/0281604 A1* 11/2008 Choo .................. G10L 19/0208
704/500

* cited by examiner

Primary Examiner — Leila Malek
(74) Attorney, Agent, or Firm — Greenberg Traurig, LLP

(57) ABSTRACT

The present disclosure relates to sampling wireless signals received at a receiver. Subsets of the digital samples are multiplied by a Pseudo-Noise (PN) code to generate tone signals. A pattern of tone signals may indicate the presence of a repeating preamble. This may be used to locate a payload that follows the preamble. A tone signal of a payload may be decoded by multiplying a subset of the digital samples with the PN code to generate a tone signal. The tone signal may be transformed into the frequency domain to identify a frequency component having an energy level above a threshold. Using the frequency component, the payload is decoded. By structuring a packet as a series of PN-code modulated tone signals, packets received from different sources may be differentiated even when they arrive at overlapping points of time. This allows for a larger transmitting capacity in a network.

20 Claims, 12 Drawing Sheets

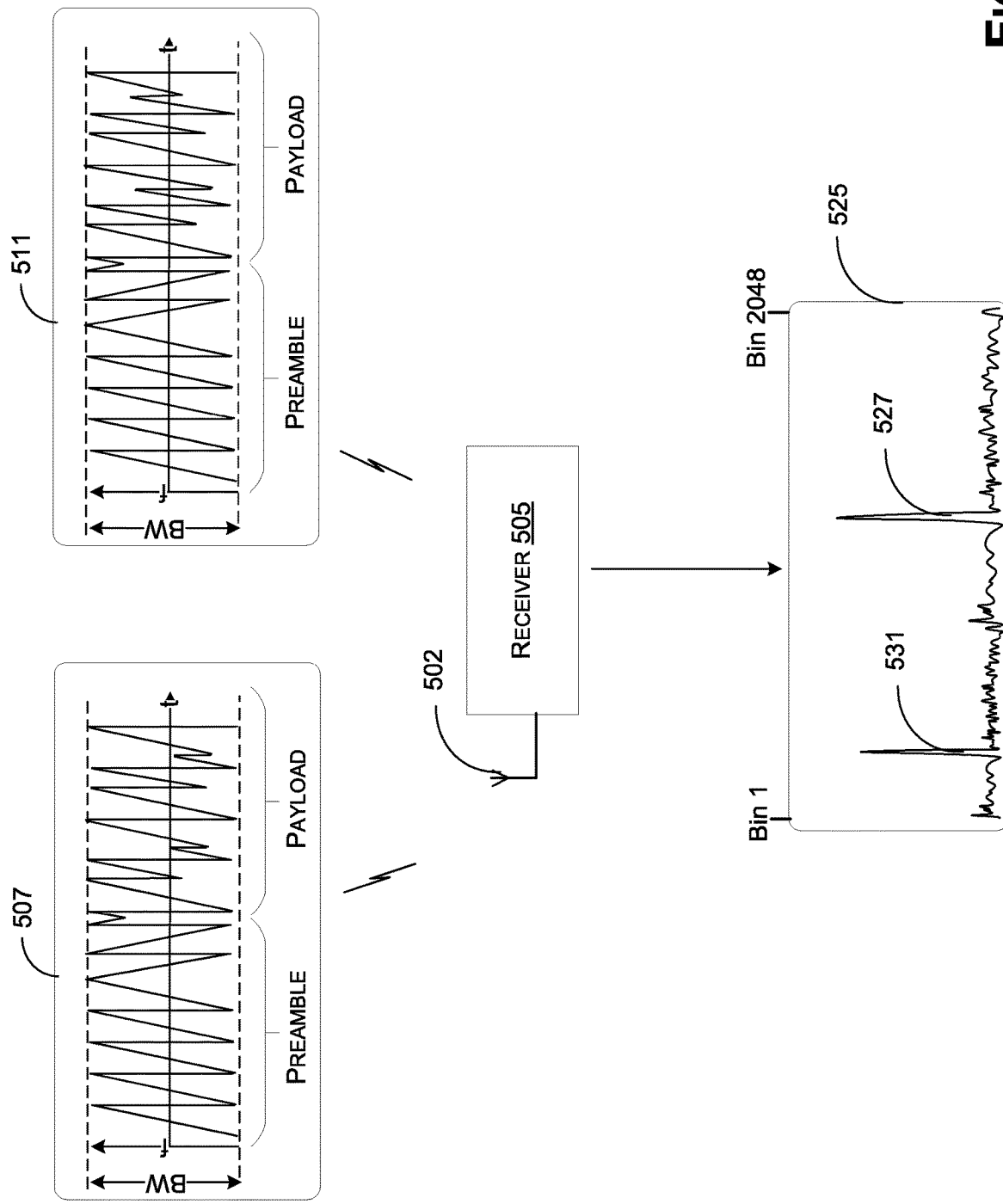

US 11,115,731 B1

WIRELESS TRANSMITTER/RECEIVER ARCHITECTURE FOR LOW-POWER WIDE AREA NETWORKS

BACKGROUND

Many network devices communicate using wireless signals. A wireless receiver of one network device may receive wireless signals from two or more other network devices at around the same time. To properly decode the received signals, the wireless receiver should be able to differentiate between data packets carried by the wireless signals received from multiple other network devices at around the same time.

BRIEF DESCRIPTION OF THE DRAWINGS

FIG. 5 is a diagram illustrating an example of a received signal that includes multiple packets;

DETAILED DESCRIPTION

Embodiments of the present disclosure are directed to a transmitter/receiver architecture that supports the ability of multiple wireless transmitters to transmit packets at overlapping points in time and a receiver to differentiate and decode these packets. Some advantages include the ability to increase network capacity by supporting many transmitting devices. Some embodiments are directed to a protocol to structure packets as a series of tone signals that are modulated by one or more Pseudo-Noise (PN) codes. A PN-code-modulated tone signal may be referred to as a symbol. In some embodiments, as a receiver receives incoming wireless signals, the receiver may differentiate overlapping packets by scanning for repeating preambles, and potentially a syncword that follows the preamble. The receiver may apply a sliding PN-code multiplication operation on the received signals as they arrive at the receiver. The symbol(s) of a packet may be identified as it follows the syncword at an amount of time defined by the protocol. The symbol(s) may also be demodulated using a PN-code. In some embodiments, a history buffer may store the received signal. An iterative subtraction approach of removing decoded packets from the history buffer may be applied by reconstructing decoded packets and subtracting them from the history buffer. This may improve the ability to identify packets that arrive at the receiver at overlapping points in time.

Figure 1:
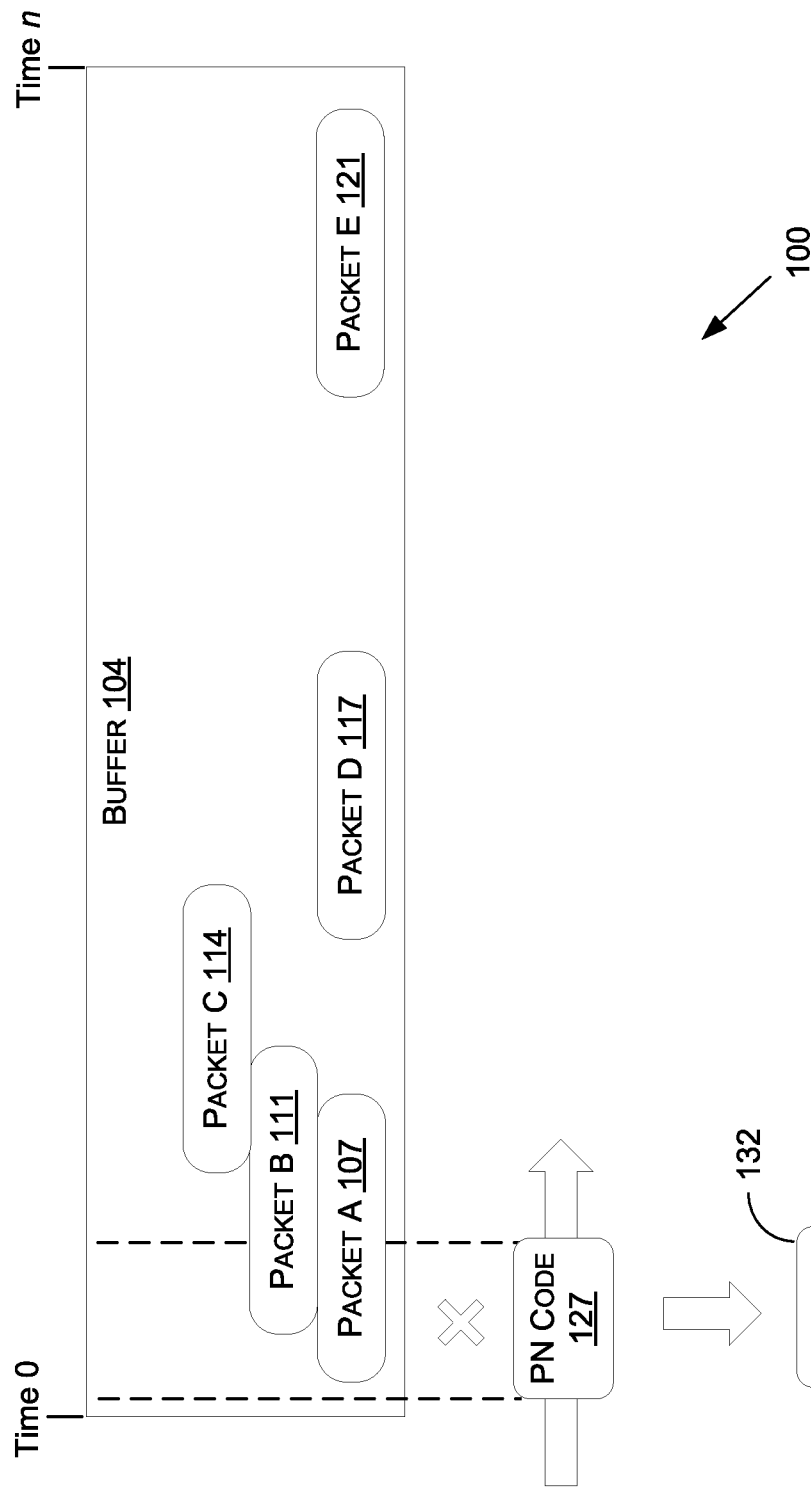
FIG. 1 is a functional block diagram of an example receiver architecture.

FIG. 1 is a functional block diagram of an example receiver architecture according to various aspects of the present disclosure. Wireless communication may take place between multiple network devices where some network devices transmit packets (e.g., transmitting devices) and some network devices receive packets (e.g., receiving devices). The network devices may be any electronic devices that are capable of communicating wirelessly with other electronic devices. For example, the network devices may include a communication module having a transmitter and/or receiver. The network devices communicate according to a wireless protocol. The transmitting devices may transmit packets to the receiving devices according to the wireless protocol. When transmitted, a packet is embodied as an electromagnetic wave that travels over a medium, such as, for example, air. The transmitting device assembles the packet according to a protocol. This may involve modulating and encoding the packet according to the protocol.

The packet is used to convey information from a transmitting device to a receiving device. This information may include data or control information. For example, the transmitting device may include a sensor that captures audio, video, or other environmental conditions. The receiving device may be a hub or other centralized communication device that receives data from the transmitting device and forwards the data to an endpoint in a network. To provide another non-limiting example, the transmitting device may be a tracking device (e.g., a pet tracker) and the receiving device may be a gateway. The tracking device and the gateway may communicate over a network such as, for example, a low-power wide-area network (LPWAN). The tracking device may be battery powered, and may periodically communicate with the gateway in a manner that conserves battery resources.

In some embodiments, the transmitting device is battery operated. As a result, to conserve energy, the transmitting device may transmit a packet at a period of time that decreases energy consumption without hindering its ability to communicate in a timely manner. For example, transmitting the packet once a minute instead of once a second may result in substantial energy savings. The packet may also be used to communicate important information such as, for example, information about the status of a door lock, information about the detection of a security threat, information about a potential fire, smoke, or dangerous environmental conditions. It may thus be important for the packet to be accurately transmitted and received by the receiving device.

FIG. 1 shows the functionality and architecture of a receiver 100 of a receiving device. The receiver 100 may include circuitry that receives wireless signals from an antenna and then processes the received wireless signals. The receiver 100 may be designed in accordance with a wireless protocol such as, for example, a Low Power Wide Area Network (LPWAN) protocol. The receiver 100 extracts packets from received wireless signals and decodes the packets to extract the information encoded in the packets. This information may be passed to a processor of the receiving device.

Wireless signals are electromagnetic waves that travel over a medium, such as, for example, air. Wireless communication systems use wireless signals to communicate information from a transmitting device to a receiving device. The transmitting device generates the wireless signal by encoding information on a carrier wave. This is transmitted to the receiving device that receives the wireless signal via an antenna. The receiving device decodes the received wireless signal to extract the encoded information. To properly communicate, the transmitting device and the receiving device operate according to a protocol. The protocol defines how information is encoded on a carrier wave and how it should be decoded.

The receiver 100 includes a buffer 104 made up of one or more memory devices. The buffer 104 may include random access memory (RAM), other volatile memory, or non-volatile memory. The buffer 104 may be a shift register that stores incoming data. Wireless signals received by the receiver 100 may include multiple packets received from different transmitting devices. The wireless signals are digitally sampled according to a sample rate and stored in the buffer 104. The buffer 104 has a buffer size that may be defined in terms of storage capacity or time. For example, the buffer 104 may store all wireless signals received for a period of time (e.g., 5 seconds). The buffer 104 may also be defined in terms of sample size such that it stores a predefined number of samples of the received signals.

Sampling is the reduction of a continuous-time signal to a discrete-time signal. A common example is the conversion of a sound wave (a continuous signal) to a sequence of samples (a discrete-time signal). A sample is a value or set of values at a point in time. A sampler is a subsystem or operation that extracts samples from a continuous signal. A theoretical ideal sampler produces samples equivalent to the instantaneous value of the continuous signal at the desired points. The original signal is retrievable from a sequence of samples by passing the sequence of samples through a type of low-pass filter called a reconstruction filter.

The example of FIG. 1 shows that the buffer 104 stores a first packet 107 (Packet A), a second packet 111 (Packet B), a third packet 114 (Packet C), a fourth packet 117 (Packet D), and a fifth packet 121 (Packet E). The Packets A-E are received at varying points in time where some packets overlap, at least partially, with other packets in the time domain. For example, as Packet A 107 is received, Packet B 111 is received moments later, and Packet C 114 is received as Packet B 111 is being received. Packet D 117 is received after Packet B 111 is completely received, but while Packet C 114 is being received. Packet E 121 is received after the other packets are completely received. A packet, as shown in FIG. 1, refers to information that may be embodied in a wireless signal, a wired signal, or stored in memory. A packet is formatted according to a communication protocol that defines the packet's structure. A packet includes a header and a payload. The header may include a preamble, a syncword, and/or other data that is defined by the protocol. A preamble may be repeated a predetermined number of times within the packet. The syncword may signify the end of the preamble. The payload may include one or more symbols that contain substantive information to be communicated. According to embodiments, a symbol is a tone multiplied by a pseudo-noise (PN) code. A tone refers to a signal that may be represented as a sinewave having a predefined frequency. In some embodiments, the same PN code may be used to modulate the preamble, syncword, and symbol(s). In other embodiments, the preamble, syncword, and symbol(s) are modulated by different PN codes. In still further embodiments, the same PN code may be used to modulate the preamble and symbol(s), while a different PN code may be used to modulate the syncword.

When two or more packets are received at or near the same time, it may be difficult to differentiate the two packets as being separate. To elaborate, the electromagnetic wave values of multiple packets are aggregated (e.g., constructive interference) such that they appear as a single signal from the perspective of the receiver's antenna. The present disclosure is directed to techniques for allowing packets to be separated and separately decoded.

To significantly improve wireless network capacity and support multiple transmitting devices, the present disclosure describes methods that allow several overlapping packets to be successfully decoded. Embodiments are directed to using a pseudo-noise (PN) code 127, where packets are encoded according to a predefined PN code 127. A PN code 127 is a sequence that may include a pseudo random sequence of +1 and −1 (e.g., a sequence of binary "ones" and "zeros." The sequence is chosen to have good autocorrelation properties, meaning that when the sequence is correlated with a time-shifted version of itself, the correlation is very weak. Encoding transmission data using the PN code 127 according to its autocorrelation property leads to a simple encoding of bits using tones of different frequencies. This allows for better differentiation between packets received at or near the same time at a receiver 100.

A PN code 127 is deterministically generated. In this respect, the function that generates the PN code will generate the same PN code when the inputs are the same. Thus, PN codes are not random, but rather generated as to appear random. One example of a PN code is a Gold code. A Gold code is generated based on two input codes of the same length and performing an exclusive OR (XOR) operation to generate the PN code. The number of binary "ones" and "zeros" within a PN code may be close to the same. For example, the number of "ones" and "zeros" of a PN code may differ by no more than one. A PN code with low autocorrelational properties may be desirable in the present embodiments. Autocorrelation is determined by comparing a signal to a time-shifted version of the original signal. Strong autocorrelation means that the signal has repeating patterns. In this case, a time-shifted version will correlate to the original. A PN code with low autocorrelation properties will have few or no repetitive patterns of sequences within the code.

The receiver 100 may use the PN code 127 to detect the presence and time location of packets in the buffer. The receiver 100 may scan for packets using the PN code. For example, the receiver may slide the PN code 127 across the buffer 104 in a forward or reverse direction. At each position, the values of the PN code 127 are multiplied with corresponding samples in the buffer 104 to yield a multiplication product 132. The multiplication product 132 is then analyzed to determine whether a pattern is detected. The pattern may be, for example, a sine wave with a single frequency component that is present at periodic time intervals. A sine wave is expressed by the function "sin(x)" where x is the frequency. The pattern may be a sine wave that lasts a few microseconds but periodically occurs over time. To analyze the multiplication product 132, the multiplication product 132 may be processed with a Fourier Transform unit to identify the amplitudes of the frequency components. If a single frequency emerges, that indicates a sine wave with a single frequency component. If the same single frequency component is detected at least a predetermined number of times at a predetermined time interval, a pattern is detected. The pattern implies that a preamble is received, which further implies that a packet is captured within the buffer 104. The presence of the packet is indicated in terms of its time location in the buffer 104.

In the example of FIG. 1, Packet A 107 and Packet B 111 may be difficult to differentiate because they are received at nearly the same time. Using the PN code 127 multiplication process described in various embodiments, the respective time locations of Packet A 107 and Packet B 111 may be identified so that these packets may be separately decoded.

Figure 2:
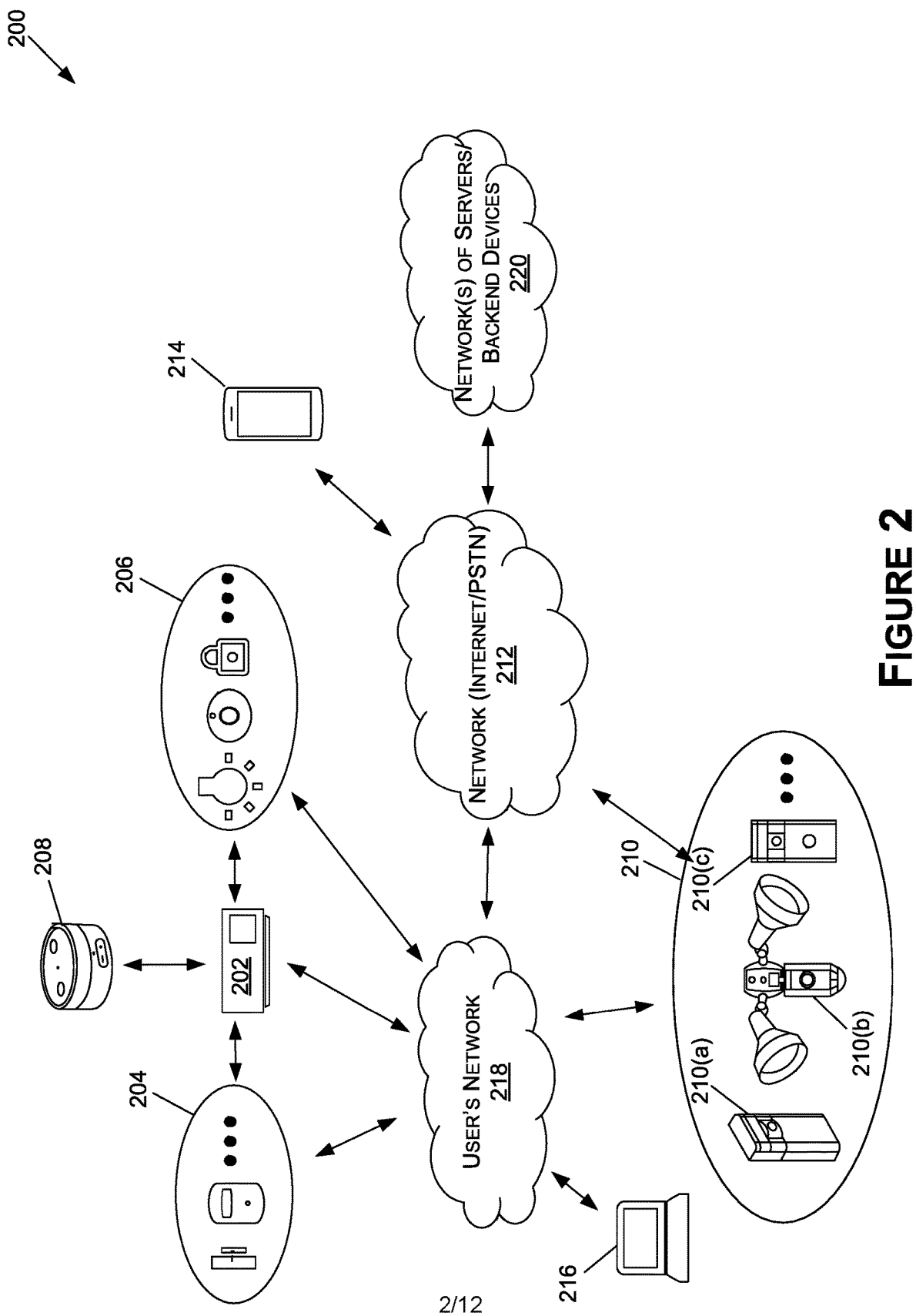
FIG. 2 is a system diagram illustrating a system for communicating in a network according to various aspects of the present disclosure.

FIG. 2 is a functional block diagram illustrating a system 200 for communicating in a network according to various aspects of the present disclosure. While this is one example of a system that may use the transmitter/receiver architecture described herein, other applications are permissible. FIG. 2 shows an example of a home automation application. For example, the transmitter/receiver architecture may be applied to locating devices for pets, children, bikes, vehicles, etc. The transmitter/receiver architecture may be implemented in smart city sensors, in industrial applications, or other commercial applications. Home automation is yet another application. Home automation enables users (e.g., homeowners and authorized individuals) to control and/or automate various devices and/or systems, such as lighting, heating (e.g., smart thermostats), ventilation, home entertainment, air conditioning (HVAC), blinds/shades, security devices (e.g., contact sensors, smoke/CO detectors, motion sensors, etc.), washers/dryers, ovens, refrigerators/freezers, and/or other network connected devices suitable for use in the home. In various embodiments, Wi-Fi is used for remote monitoring and control of such devices and/or systems. Network devices include various devices that communicate wirelessly such as, for example, smart home devices. Smart home devices (e.g., hub devices 202, sensors 204, automation devices 206, a virtual assistant (VA) device 208, audio/video (A/V) recording and communication devices 210, etc.), when remotely monitored and controlled via a network (Internet/a public switched telephone network (PSTN)) 212, may be considered to be components of the "Internet of Things." Smart home systems may include switches and/or sensors (e.g., the sensors 204) connected to a central hub such as the smart-home hub device 202 and/or the VA device 208 (the hub device 202 and/or the VA device 208 may alternatively be referred to as a gateway, a controller, a home-automation hub, a communication hub, or an intelligent personal assistance device) from which the system may be controlled through various user interfaces, such as voice commands and/or a touchscreen. Various examples of user interfaces may include any or all of a wall-mounted terminal (e.g., a keypad, a touchscreen, etc.), software installed on the client devices 214, 216 (e.g., a mobile application), a tablet computer, or a web interface. Furthermore, these user interfaces are often but not always supported by Internet cloud services. In one example, the Internet cloud services are responsible for obtaining user input via the user interfaces (e.g., a user interface of the hub device 202 and/or the VA device 208) and causing the smart home devices (e.g., the sensors 204, the automation devices 206, etc.) to perform an operation in response to the user input.

The hub device 202, the VA device 208, the sensors 204, the automation devices 206, the A/V recording and communication devices 210, and/or the client devices 214, 216 may use one or more wired and/or wireless communication protocols to communicate, including, for example and without limitation, Wi-Fi (e.g., the user's network 218), X10, Ethernet, RS-485, 6LoWPAN, Bluetooth LE (BLE), ZigBee, Z-Wave, and/or a low-power wide-area networks (LP-WAN), such as a chirp spread spectrum (CSS) modulation technology network, an Ultra Narrow Band modulation technology network (e.g., Sigfox, Telensa, NB-IoT, etc.), and/or the like.

The user's network 218 may be, for example, a wired and/or wireless network. If the user's network 218 is wireless, or includes a wireless component, the user's network 218 may be a Wi-Fi network compatible with the IEEE 802.11 standard and/or other wireless communication standard(s). Furthermore, the user's network 218 may be connected to other networks such as the network 212, which may comprise, for example, the Internet and/or PSTN.

The system 200 may include one or more A/V recording and communication devices 210 (alternatively referred to herein as "A/V devices 210" or "A/V device 210") (which may represent, and/or be similar to, the transmitting devices and receiving devices discussed above with respect to FIG. 1). The A/V devices 210 may include security cameras 210(a), light cameras 210(b) (e.g., floodlight cameras, spotlight cameras, etc.), video doorbells 210(c) (e.g., wall powered and/or battery powered video doorbells), and/or other devices capable of recording audio data and/or image data. The A/V devices 210 may be configured to access a user's network 218 to connect to a network (Internet/PSTN) 212 and/or may be configured to access a cellular network to connect to the network (Internet/PSTN) 212.

The system 200 may further include a hub device 202 connected to the user's network 218 and/or the network (Internet/PSTN) 212. The hub device 202 may also refer to the transmitting and receiving devices discussed above with respect to FIG. 1. The smart-home hub device 202 (also known as a home automation hub, gateway device, or network device), may comprise any device that facilitates communication with and control of the sensors 204, automation devices 206, the VA device 208, and/or the one or more A/V devices 210, each of which may be the transmitting and receiving devices discussed above with respect to FIG. 1. For example, the smart-home hub device 202 may be a component of a security system and/or a home automation system installed at a location (e.g., a property, a premise, a home, a business, etc.). In some embodiments, the A/V devices 210, the VA device 208, the sensors 204, and/or the automation devices 206 communicate with the smart-home hub device 202 directly and/or indirectly using one or more wireless and/or wired communication protocols (e.g., BLE, Zigbee, Z-Wave, etc.), the user's network 218 (e.g., Wi-Fi, Ethernet, etc.), and/or the network (Internet/PSTN) 212. In some of the present embodiments, the A/V devices 210, the VA device 208, the sensors 204, and/or the automation devices 206 may, in addition to or in lieu of communicating with the smart-home hub device 202, communicate with the client devices 214, 216, the VA device 208, and/or one or more of components of the network of servers/backend devices 220 directly and/or indirectly via the user's network 218 and/or the network (Internet/PSTN) 212.

As illustrated in FIG. 2, the system 200 includes the VA device 208. The VA device 208 may be connected to the user's network 218 and/or the network (Internet/PSTN) 212. The VA device 208 may include an intelligent personal assistant, such as, without limitation, Amazon Alexa® and/or Apple Siri® For example, the VA device 208 may be configured to receive voice commands, process the voice commands to determine one or more actions and/or responses (e.g., transmit the voice commands to the one or more components of the network of servers/backend devices 220 for processing), and perform the one or more actions and/or responses, such as to activate and/or change the status of one or more of the sensors 204, automation devices 206, or A/V devices 210. In some embodiments, the VA device 208 is configured to process user inputs (e.g., voice commands) without transmitting information to the network of servers/backend devices 220 for processing. The VA device 208 may include at least one speaker (e.g., for playing music, for outputting the audio data generated by the A/V devices 210, for outputting the voice of a digital assistant, etc.), at least one a microphone (e.g., for receiving commands, for recording audio data, etc.), and a display (e.g., for displaying a user interface, for displaying the image data generated by the A/V devices 210, etc.). In various embodiments, the VA device 208 may include an array of speakers that are able to produce beams of sound. Although illustrated as a separate component in FIG. 2, in some embodiments the VA device 208 may not be a separate component from the hub device 202. In such embodiments, the hub device 202 may include the functionality of the VA device 208 or the VA device 208 may include the functionality of the hub device 202.

The one or more sensors 204 may include, for example, at least one of a door sensor, a window sensor, a contact sensor, a tilt sensor, a temperature sensor, a carbon monoxide sensor, a smoke detector, a light sensor, a glass break sensor, a freeze sensor, a flood sensor, a moisture sensor, a motion sensor, and/or other sensors that may provide the user/owner of the security system a notification of a security event at his or her property.

In various embodiments, a contact sensor may include any component configured to inform (e.g., via a signal) the security system whether an object (e.g., a door or a window) is open or closed. A contact sensor may include first and second components: a first component installed on the object itself (e.g., the door or the window); the second component installed next to the object (e.g., on the door jamb). The first and second components of the contact sensor, however, need not actually be in physical contact with one another in order to be in the closed (not faulted) state. For example, at least one of the first and second components may include a magnet, and the contact sensor may rely on the Hall effect for determining a proximity of the first and second pieces to one another. When the door, window, or other object, is opened, and the first and second components move apart from one another, the contact sensor may transmit an open signal to the security system (e.g., to the hub device 202). A similar process may be performed when the object is closed. In some examples, a signal transmitted by the security system by the contact sensor during opening and/or closing may be the same signal, and the hub device 202 may interpret the signal based on the known state of the object (e.g., when a door is closed, and the signal is received, the hub device 202 may update the status of the door to open).

The one or more automation devices 206 may include, for example, at least one of an outdoor lighting system, an indoor lighting system, and indoor/outdoor lighting system, a temperature control system (e.g., a thermostat), a shade/blind control system, a locking control system (e.g., door lock, window lock, etc.), a home entertainment automation system (e.g., TV control, sound system control, etc.), an irrigation control system, a wireless signal range extender (e.g., a Wi-Fi range extender, a Z-Wave range extender, etc.) a doorbell chime, a barrier control device (e.g., an automated door hinge), a smart doormat, and/or other automation devices.

As described herein, in some of the present embodiments, some or all of the client devices 214, 216, the A/V device(s) 210, the smart-home hub device 202, the VA device 208, the sensors 204, and the automation devices 206 may be referred to as a security system and/or a home-automation system. The security system and/or home-automation system may be installed at a location, such as a property, building, home, business, or premises for the purpose of securing and/or automating all or a portion of the location.

The system 200 may further include one or more client devices 214, 216. The client devices 214, 216 may communicate with and/or be associated with (e.g., capable of access to and control of) the A/V devices 210, a smart-home hub device 202, the VA device 208, sensors 204, and/or automation devices 206. In various embodiments, the client devices 214, 216 communicate with other devices using one or more wireless and/or wired communication protocols, the user's network, and/or the network (Internet/PSTN) 212, as described herein. The client devices 214, 216 may comprise, for example, a mobile device such as a smartphone or a personal digital assistant (PDA), or a computing device such as a tablet computer, a laptop computer, a desktop computer, etc. In some embodiments, the client devices 214, 216 includes a connected device, such as a smartwatch, Bluetooth headphones, another wearable device, or the like. In such embodiments, the client devices 214, 216 may include a combination of the smartphone or other device and a connected device (e.g., a wearable device), such that alerts, data, and/or information received by the smartphone or other device are provided to the connected device, and one or more controls of the smartphone or other device may be input using the connected device (e.g., by touch, voice, etc.).

The A/V devices 210, the hub device 202, the VA device 208, the automation devices 206, the sensors 204, and/or the client devices 214, 216 may also communicate, via the user's network 218 and/or the network (Internet/PSTN) 212, with network(s) of servers and/or backend devices 220, such as (but not limited to) one or more remote storage devices (which may be referred to interchangeably as "cloud storage device(s)"), one or more servers, and one or more backend application programming interfaces (APIs).

The network 220 may be any wireless network, any wired network, or a combination thereof, configured to operatively couple the above-mentioned modules, devices, components, and/or systems as illustrated in FIG. 2.

The hub device 202, sensors 204, automation devices 206, the VA device 208, the A/V devices 210, or client devices 214, 216 and/or any of the components of the network(s) may be referred to herein as a "network device" or "network devices." In this respect network device refers to a device that communicates wirelessly according to a wireless protocol. The transmitting and receiving devices discussed above with respect to FIG. 1 may include one or more of the network devices described herein. In addition, the packets discussed above with respect to FIG. 1 may convey any of the information discussed above with respect to FIG. 2.

Figure 3:
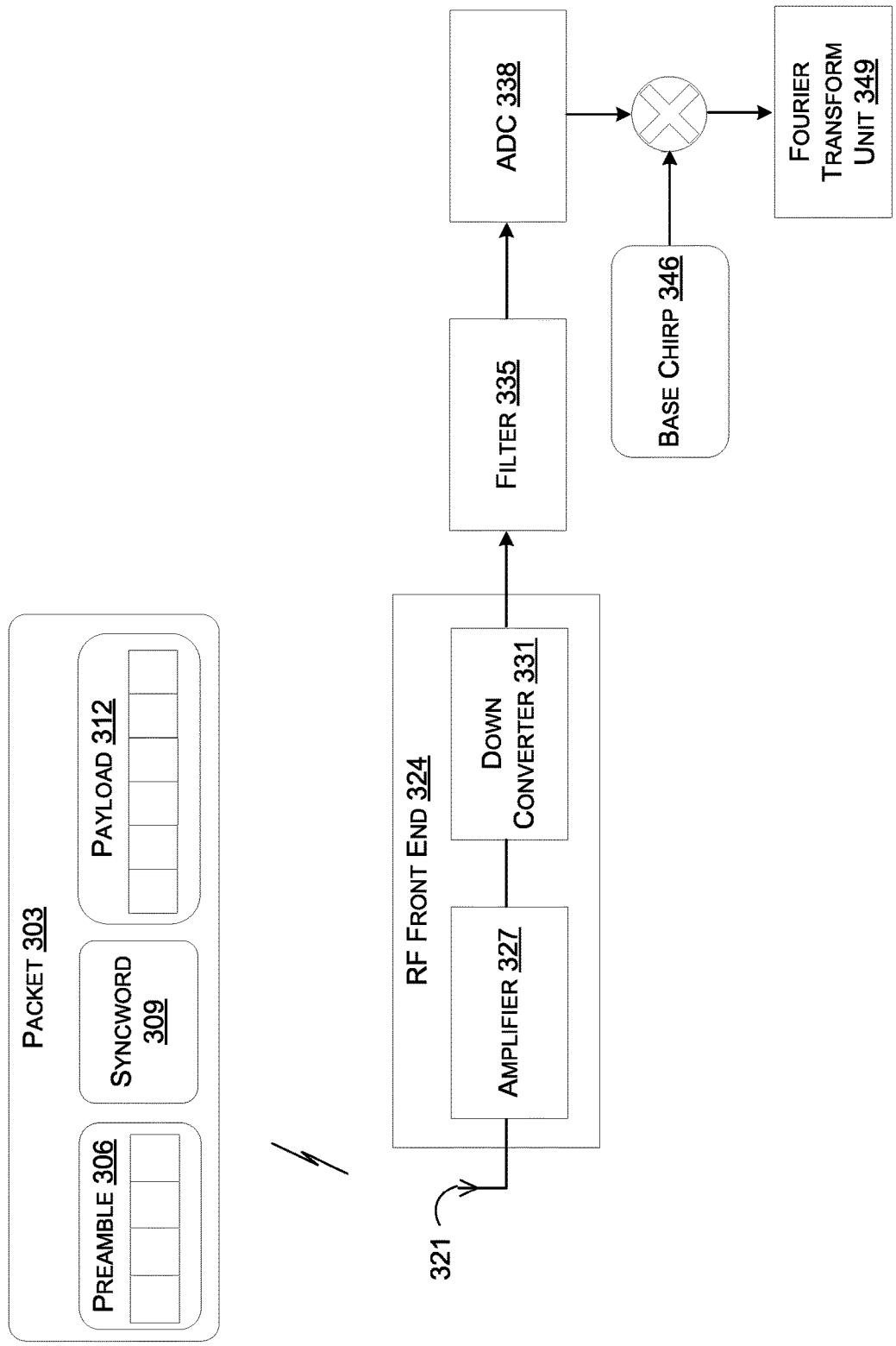
FIG. 3 is a functional block diagram illustrating the communication of a packet.

FIG. 3 is a functional block diagram illustrating the communication of a packet 303. FIG. 3 depicts the transmission and reception of packets without any PN-code modulation. The packet 303 is generated at a transmitting device and then transmitted wirelessly to a receiving device. A packet 303 may include a preamble 306, a syncword 309, and a payload 312. The preamble 306 may include a predefined pattern defined by a transmission protocol. The pattern may be a predefined sinusoidal pattern such as an upchirp, downchirp, or any other pattern. Moreover, the pattern in the preamble may repeat a predetermined number of times according to the transmission protocol. This allows a receiver to identify a packet and determine whether it is formatted according to a particular transmission protocol. For example, if the receiver observes that a particular symbol repeats a predetermined number of times, the receiver may infer that it has observed a preamble. That is, the frequency components of each symbol are equal and, further, they are spaced apart in time according to a predetermined amount of time defined by a transmission protocol. This signifies the beginning of a packet. The number of times the symbols of the preamble repeat is specified by the protocol that defines the packet. A syncword 309 comprises data that is specified by the transmission protocol. The syncword 309 may be encoded after the last repetition of the pattern of the preamble 306. The syncword 309 signifies when the preamble ends and when the payload 312 begins. The payload 312 includes one or more symbols, substantive information such as data or control information. Examples of such data or control information are previously described above with respect to FIG. 1 and FIG. 2.

Once the packet 303 is generated and wirelessly transmitted, FIG. 3 shows it being received by a receiver. Specifically, the packet 303 is received by an antenna 321 where it is then sent to an RF front end 324. The RF front end 324 is a component of a receiver responsible for receiving and processing a received signal so that it can be decoded. For example, the RF front end 324 may include an amplifier 327 and a down converter 331. The amplifier 327 may amplify received signals for subsequent processing. This may improve the ability to process signals that are received with low signal strength. The down converter 331 may shift the frequency to a baseband frequency range. The down converted signal may then pass through a filter 335. The filter 335 may reject out-of-band frequencies, thereby limiting the signal to in-band frequencies only. Thereafter, an analog-to-digital converter (ADC) 338 converts the filtered analog signal into digital samples. The ADC 338 operates according to a sampling rate to generate a digital representation of the filtered analog signal. In some embodiments, the ADC 338 may be part of the RF front end 324. Further, in some embodiments, the RF front end 324 may include one or more additional components, such as a noise filter for removing noise, a bandpass filter to remove strong out-of-band signals that are likely to originate from interference sources, or other components to process the signal before the signal is decoded.

Analog to digital conversion, as performed by the ADC 338, involves the conversion of an analog signal (e.g., an electromagnetic wave) into a digital signal. The ADC 338 samples the analog signal at a sampling rate. Each sample is represented by a time (e.g., the position or location of an instance of the analog signal) and a corresponding amplitude at that time. A larger sampling rate leads to more samples within a window of time, thereby increasing the quality of the digital signal. A digital signal is therefore an approximation of the analog signal through the use of samples. A digital signal refers to a series of digital samples that represent an analog wave. The digital conversion allows the signal to be handled by processors to decode packets that may be present in the received wireless signal. To decode packets, the digitized signal may be multiplied by a base chirp signal 346 to generate an output. The base chirp signal 346 may be a zero time shifted signal, for example. The output is then provided to a Fourier transformation unit 349.

The Fourier transformation unit 349 converts the received input into frequency-domain data so that the information contained in the packet 303 can be decoded.

Figure 4:
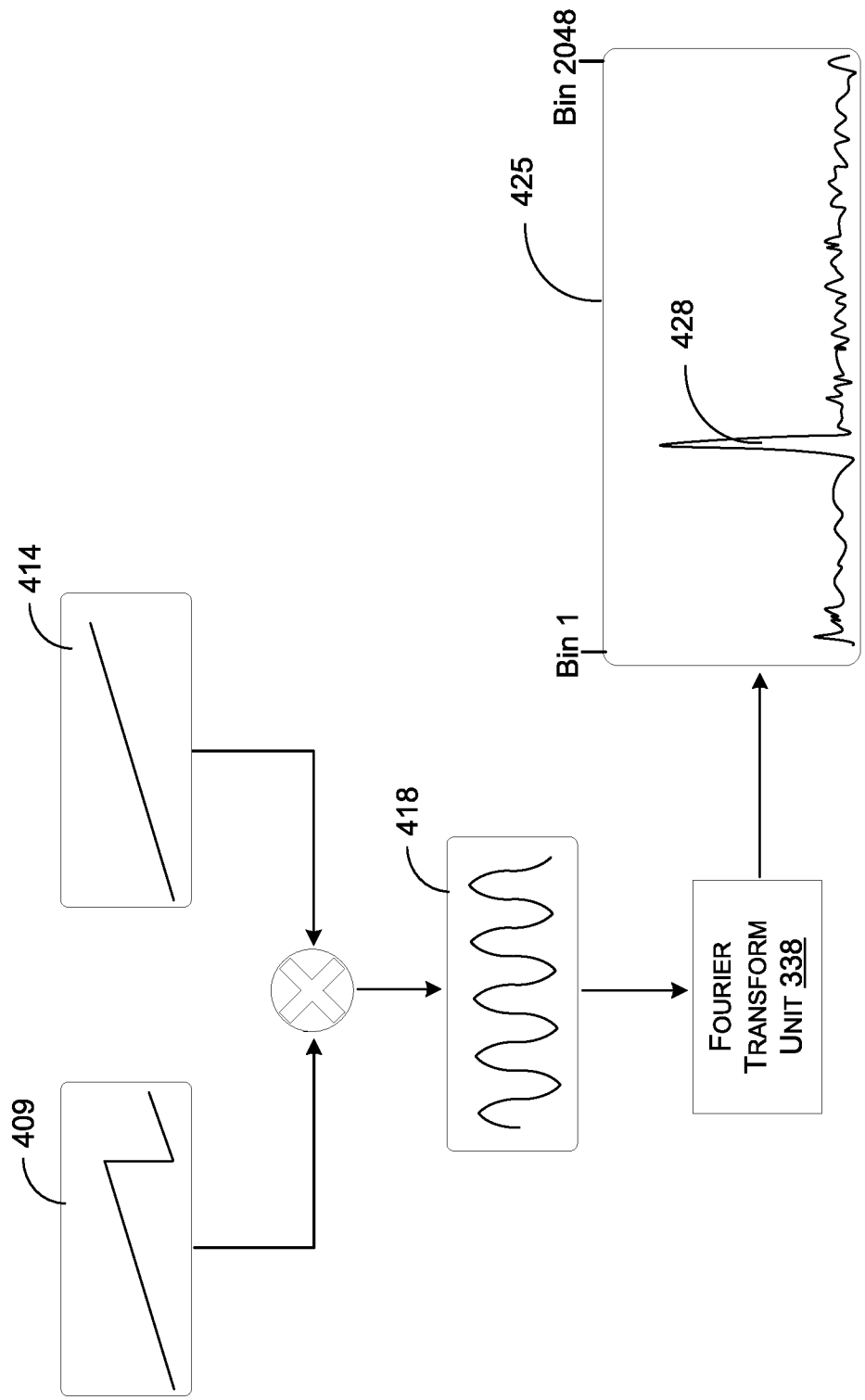
FIG. 4 is a diagram illustrating the decoding of a packet.

FIG. 4 is a functional block diagram illustrating the decoding of a packet such as, for example, the packet 303 of FIG. 3. Like FIG. 3, FIG. 4 also depicts the transmission and reception packets of without any PN-code modulation. FIG. 4 depicts a received chirp 409. The received chirp 409 may be part of a payload such as, for example the payload 312 of FIG. 3. The received chirp 409 is obtained by receiving a wireless signal and filtering it (e.g., using the filter 335) to identify the received chirp 409. To generate the received chirp 409, data is modulated on a chirp signal. As shown in FIG. 4, the chirp signal may be a linear frequency sweep from low to high. When represented in the frequency domain, this appears as a positively sloped line. Modulating data on the chirp signal causes variations in the signal as shown in the signal of the received chirp 409. The received chirp 409 is multiplied by a base chirp 414. The base chirp 414 is an unmodulated chirp signal.

Multiplying the received chirp 409 by a base chirp 414 yields a multiplication product 418, which is provided as an input signal into the Fourier transformation unit 338. The multiplication product 418 represents a tone signal of a symbol contained in the packet, and the tone signal represents the data contained in the packet. The tone signal may be modulated according to CSS modulation.

The Fourier transformation unit 338 converts the input signal into frequency-domain data 425. The Fourier transformation unit 338 generates the frequency-domain data 425 based on a predefined number of bins (e.g., frequency ranges that, together, make up the bandwidth of the input signal). The example of FIG. 4 depicts 2048 bins, which is based on the spreading factor (SF=11, $2^{SF}$=2048) of the received chirp signal 409.

A max bin 428 is identified, the max bin 428 having the greatest energy level compared to the energy levels of the other bins in the frequency-domain data 425. The bin number of the max bin 428 maps to a data sequence that equates to the data encoded in the received chirp 409. For example, if the max bin 428 is bin number 732, then the data encoded in the received chirp 409 is "1011011100" (which is 732 in binary).

In the process of FIG. 4, the packet 303 is received without any overlapping packets, and the process is thus able to decode the packet 303. FIG. 5, by contrast, is an illustration showing an example of received signals that include multiple overlapping packets. FIG. 5 illustrates a situation where a receiver receives a first packet 507 and second packet 511 at around the same point in time. At an antenna 505 of the receiver, there is no way to distinguish the first packet 507 from the second packet 511, as both are combined as an electromagnetic wave. If not properly handled, the first packet 507 and/or the second packet 511 will not be properly decoded because it may be difficult to separate the components of received signals into the first packet 507 and the second packet 511.

If not properly addressed, the received chirp may be submitted to a Fourier transformation unit that generates frequency-domain data 525 that includes more than one bin having large energy levels. For example, the frequency-domain data 525 may include a first max frequency bin 527 and second max frequency bin 531. Moreover, it may be difficult to determine which max frequency bin is associated with which packet. The present embodiments solve this problem by using a pseudo-noise (PN) code to modulate and demodulate frequency tones, which improves the ability to differentiate between data packets received at about the same time from different sources. At the transmit side, each group of data bits is encoded into a frequency tone. The tone is then multiplied by the PN code before being transmitted. At the receiver side, the process is reversed. The received signals are multiplied by the PN code to reproduce the tone. The tone is then processed through a Fourier transform, at which point the frequency of the tone can be read out and the bits are decoded.

Figure 6A:
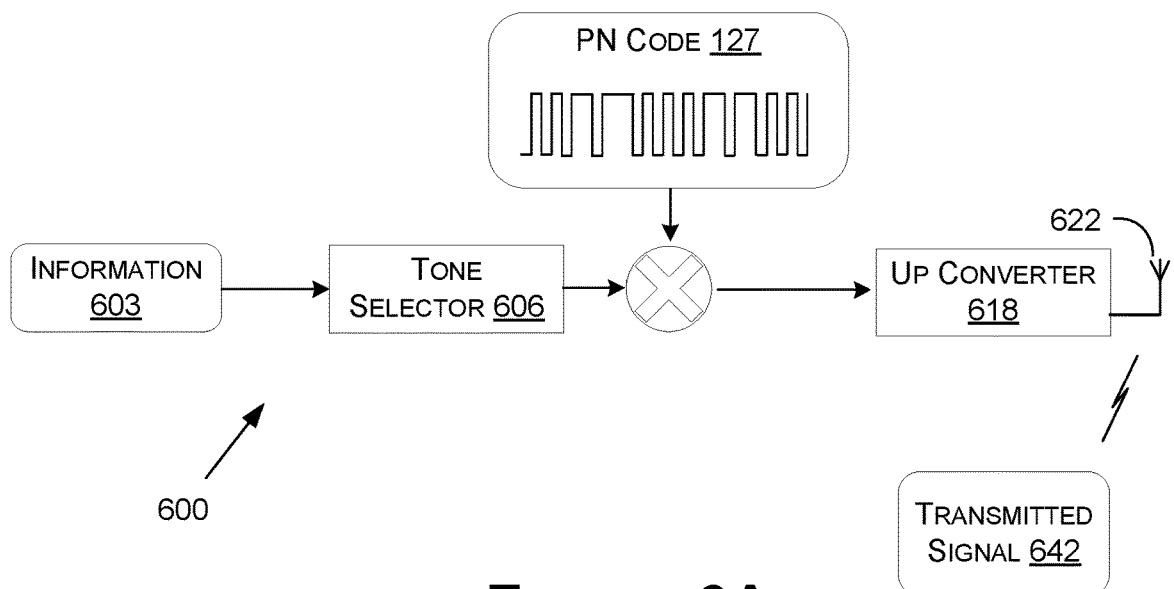
FIG. 6A is a functional block diagram illustrating one example of a transmitter of a transmitting device according to various aspects of the present disclosure.

FIG. 6A is a functional block diagram illustrating one embodiment of a transmitter 600 of a transmitting device according to various aspects of the present disclosure. The transmitter 600 may be part of the physical layer of a network device. The transmitter 600 may be part of a transceiver or separate from a receiver. The transmitter 600 may be part of a radio frequency (RF) component that is coupled to at least one antenna for transmitting a signal. The transmitter receives information and converts it to a transmitted signal intended for a receiving device in the network.

The transmitter 600 receives information 603 to be conveyed to a receiving device. The information may include data or control information and is expressed as digital data. The transmitter 600 includes a tone selector 606, an up converter 618, and an antenna 622. The information 603 may be received at an input stage to the transmitter. The input stage may receive information to be communicated over a wireless network to the receiver. The information may originate from a hub device 202, sensor 204, automation device 206, virtual assistant (VA) device 208, audio/video (A/V) recording and communication devices 210, or any other network device. The information may include digital samples pertaining to sensor readings or pertaining to data or control information, for example. The information may include important environmental information to be conveyed to another network device. The information may also include control instructions or commands to control an external device. The information may be expressed in digital or analog format as a signal. A signal may refer to information embodied on an electromagnetic wave that is transmitted over air (e.g., a wireless signal) or through conductive material (e.g., a wired signal). The information may include data that is subject to communication between two devices or it may include control information used to instruct a device to perform operations.

The tone selector 606 divides the information 603 into groups of bits according to the spreading factor (SF). The larger the spreading factor, the lower the data rate, and the more bits within the group. The group of bits is thus an SF group of bits. By way of example, the information 603 may indicate a device status of "active." This status may correspond to the decimal value of "685," which can also be represented as an eleven-bit binary sequence of "01010101101." A SF of eleven may be selected to send the eleven-bit sequence to the receiver. This eleven-bit sequence maps to one of 2048 potential frequency bins, where the number of frequency bins is determined by 2^SF. Specifically, the sequence "01010101101" falls into bin number 685 (in decimal) of the 2048 frequency bins. In an example having a bandwidth of 1000 KHz, where the bandwidth is divided into 2048 bins, each bin is 488 Hz wide.

The tone selector 606 generates a tone based on the values of the SF group of bits. The tone may be a single-frequency tone having a frequency that maps to the value of the SF group of bits. Using the example above, the frequency of the tone corresponding to bin 685 (where each bin is 488 Hz wide) would be a bin ranging from 333.98 KHz to 334.47 KHz. In addition, there may be a predefined frequency offset used in generating the tone signal. For example, if the frequency offset is 900 MHz, the tone would have a frequency within the range of 900.33398 MHz to 900.33447 MHz.

On the receiver end, the tone will be extracted from the received wireless signal and used to generate frequency-domain data having a bin that corresponds to the tone generated by the tone selector 606, and the number of this bin will map to the bit values in the SF group of bits. This mapping is described in greater detail below.

The output of the tone selector 606 is a modulated by the PN code 127. This PN code-modulated tone signal is passed to the up converter 618 that shifts the frequency from a baseband range to a high frequency range to be transmitted. This may involve encoding the chirp signal onto a high frequency carrier wave. A carrier wave is an electromagnetic wave that is modulated to convey information, thereby resulting in a signal. Without modulation, a carrier wave alone contains no information. The characteristics of a carrier wave (e.g., its frequency) are dictated by the intended type of wireless transmission protocol. The carrier wave is generated according to the transmission protocol. The transmission protocol defines the type and manner of modulation. For example, data may be modulated according to amplitude, frequency, phase or a combination thereof.

The transmitter 600 may also include a power amplifier (not shown) to amplify the signal prior to transmission. The amplified signal is transmitted to the antenna 622, resulting in a transmitted signal 642. The transmitted signal 642 includes the encoded information 603 and is formatted according to the transmission protocol and encoded using the PN code 127.

In other embodiments, information 603 may be encoded using the frequency value instead of the discrete bins. Information 603 may be encoded using frequencies that are not exact multiples of the discrete frequency bins described above. To decode these frequencies, a Fourier transformation unit may be reconfigured to accommodate a higher frequency resolution. In some embodiments, a zero padding technique may be used to increase the frequency resolution of the Fourier transformation unit. For example, the input signal supplied to the Fourier transformation unit may be increased in length by padding the input signal with zeros. The Fourier transformation unit may then generate corresponding frequency-domain data with a resolution that reflects the length of the input signal.

In other embodiments, the phase of the tone signal can be used to encode at least a portion of the information 603. For example, a phase of the tone signal (e.g., 0°, 90°, 180°, 270° phase) may correspond to additional bits of information. If there are four possible phase shifts, a particular phase shift may correspond to two bits of information per symbol. The phase of the tone signal refers to the amount of time shift of the sinusoidal function. Thus, by time shifting the tone signal, additional information may be encoded. A first portion of the bits of the information 603 specify the frequency of the tone signal while a second portion of bits of the information 603 specify the phase of the tone signal with respect to the phase of the preamble and/or syncword. This results in a frequency-and-phase-encoded tone signal. For example, by using 4096 different tone frequencies and 4 phases, 14 bits of information may be encoded per tone.

To decode a frequency-and-phase-encoded tone signal, the receiver would synchronize to the frequency, phase, and time using the preambles arriving at the receiver. For example, the preamble and syncword of a packet indicate the timing of when the payload symbols are expected to be received or where they are located in the buffer. The transmission protocol defines when the payload is positioned relative to the syncword and/or end of the preamble. To synchronize the frequency, once the receiver detects a preamble, the receiver determines the frequency offset based on the difference between the frequency of the preamble and the expected frequency of the preamble. To synchronize the phase, the receiver determines the phase of the preamble and determines whether there is a phase shift between the preamble and the payload. The amount of change in phase between the preamble tone signal and the payload tone signal is converted into a bit value. For example, the change in phase between two tone signals may be one of four phase changes (e.g., 0°, 90°, 180°, 270°). Each of the four phase changes maps to a bit value (e.g., 00, 01, 10, 11) to allow the encoding of two bits of information 603.

In other embodiments, additional data may be encoded by modulating the amplitude of the tone signal. For example, the tone signal's amplitude may be modulated to encode at least a portion of the information 603. In this example, a first portion of the bits making up the information 603 are used select the frequency of the tone signal and a second portion of the bits are used to select the amplitude of the tone signal. The amplitude may be decoded by detecting a relative amplitude between the payload symbol tone and the preamble tone. For example, the difference in amplitude or the ratio of amplitudes (between the payload symbol tone and the preamble tone) is a value that is decoded to yield the second portion of the bits.

While the discussion above explains how the information 603 may be encoded on a tone signal using a combination of frequency, phase, and/or amplitude, this may increase the receiver's sensitivity to noise and interference. A receiver's noise refers to signal levels that appear to be sensed in the absence of any received signals. Noise is a result of internal components of the receiver that may inadvertently produce electromagnetic interference. This leads to unwanted electrical signals that are random and resulting from fluctuating voltages. A receiver having significant noise may make it more difficult to detect sensitives in received signals because the receiver may not be able to differentiate between the received signals and the noise.

A transmitter may adjust the encoding mechanisms depending on how much noise is in the receiver to increase data rate when there is less noise. For example, if the receiver detects a low noise signal, it may send a communication to the transmitter to encode information 603 using phase and/or amplitude modulation. If the receiver detects high noise, it may send a communication to the transmitter to encode information 603 using only frequency modulation.

Figure 6B:
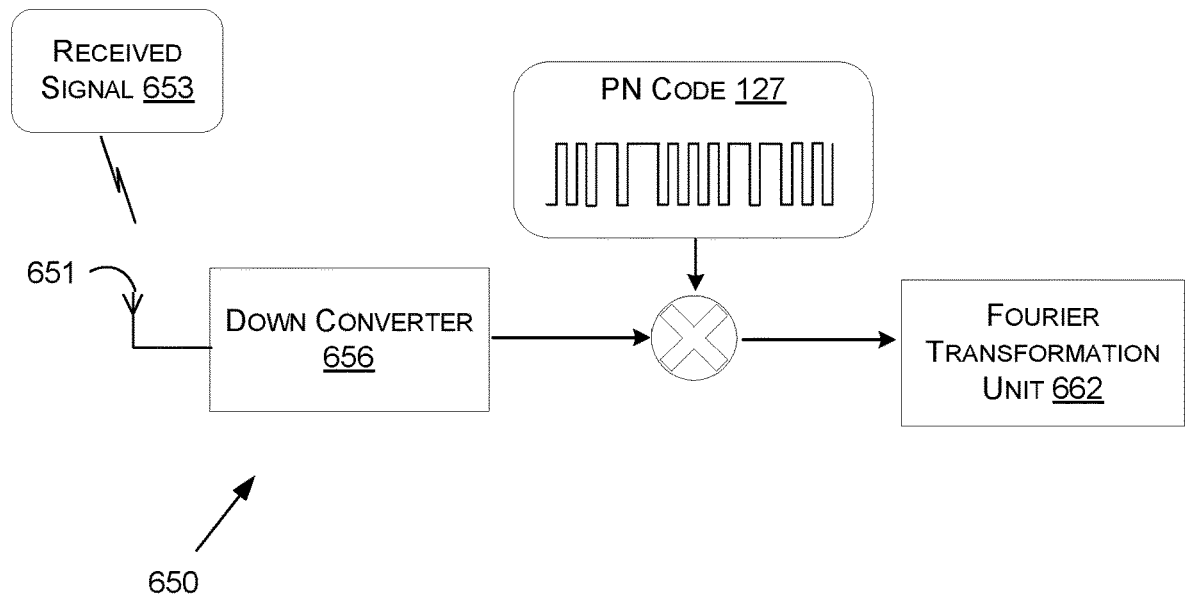
FIG. 6B is a functional block diagram illustrating one example of a receiver of a receiving device according to various aspects of the present disclosure.

FIG. 6B is a functional block diagram illustrating one embodiment of a receiver 650 of a receiving device according to various aspects of the present disclosure. The receiver 650 may be part of a communication module of a device depicted in FIG. 2. The receiver 650 may be part of the physical layer of a communication module. The receiver 650 may be part of a transceiver or separate from a transmitter. The receiver 650 may be part of a radio frequency (RF) component that is coupled to an antenna 651 for receiving received signals 653.

Although the transmitter 600 and receiver 650 may be in the same communication network, the received signals 653 may be different from the transmitted signal 642. For example, the received signals 653 may include the transmitted signal 642 as a component, but may also include other components resulting from interference from other transmitted signals. In other words, the received signals 653 may be an aggregation of all electromagnetic waves sensed by the antenna 651, which includes the transmitted signal 642.

The receiver 650 includes a down converter 656 and a Fourier Transformation unit 662. The receiver may include other components described above with respect to FIG. 3. For example, the receiver 650 may include an RF front end 324, a filter 335, and an ADC 338. As a general overview, the received signals 653 are down converted to baseband frequency using the down converter 656. The down-converted signal is multiplied by the PN code 127. This may be a vector multiplication between two vectors of the same length where each element of a first vector is multiplied by corresponding elements of a second vector to yield a multiplication product that is a vector having the same length as the input vectors. The multiplication product is then used to generate a tone signal. The tone signal is fed into the Fourier Transformation unit 662, which converts the received input (which is in the time domain) into frequency-domain data. Data may be expressed in the time domain or the frequency domain. When expressed in the time domain, the data changes over time. For example, a sine wave represented in the time domain appears as an oscillating wave having its amplitude change over time. When expressed in the frequency domain, data is represented as a set of frequency components for a particular window of time. A Fourier transformation is a mathematical operation the receives a sinusoidal wave for a window of time and generates the frequency components for the sinusoidal wave.

The Fourier transformation unit 662 may use a predetermined number of bins to generate the frequency-domain data, where each bin represents a contiguous frequency range. As described below, the number of bins used by the Fourier transformation unit 662 corresponds to the data rate of the input signal. More bins mean that the frequency-domain data has more frequency resolution. As a result, the frequency range of each bin decreases when increasing the number of bins.

The payload of a packet in the received signals 653 may encode bits according to a data rate defined by a spreading factor (SF). The payload is made up of one or more symbols. A symbol is portion of a signal that represents data or information. A preamble may be made up of several repeating and identical symbols. The syncword may be a symbol. And the payload of a packet may include one or more symbols. According to embodiments, a symbol is generated from a tone signal that is modulated. A tone is a single frequency signal where the frequency of the tone corresponds to something meaningful (e.g., a particular frequency may be reserved for preambles while other frequencies may be reserved for syncwords). The tone signal may be modulated by a PN-code to generate a PN code-modulated symbol. A series of symbols make up a packet.

The Fourier transformation unit 662 generates frequency-domain data using bins that correspond to the SF of the input signal. Specifically, the bin count equals $2^i$. Assuming an SF of 11, the bin count for the Fourier transformation unit 662 is 2048. That means the Fourier transformation unit 662 performs a Fourier transformation and segments the frequency components across 2048 bins, where the total frequency range covered by the bins equals the bandwidth of the input signal. To decode a packet symbol, the bin corresponding to the frequency of the tone that was encoded at the transmit side is identified. The bin number of the identified bin maps to the digital representation of the data that was encoded. For example, if the decimal bin number 999 is the identified bin, the decimal bin number 999 maps to the binary value "1111100111" (which is 999 in binary). Therefore, the data extracted from the packet is "1111100111." In another example, if the identified bin is bin number 732, then the data extracted from the packet is "1011011100" (which is 732 in binary).

The Fourier transformation unit 662 may be a Fast Fourier transform (FFT) block or a discrete Fourier transform (DFT) block, for example. A Fourier transformation refers to any operation that converts time-domain data to frequency-domain data. A DFT operation involves decomposing a sequence of values into components of different frequencies. This operation may involve a significant amount of computation resources. An FFT operation is an optimization of a DFT operation, wherein an FFT operation, the transformation involves factorizing DFT data into sparse factors. The frequency-domain data has a predetermined number of frequency bins that is set based on the spreading factor of the input into the Fourier transformation unit 662. In this respect, the predetermined number of frequency bins is based on the number of bits represented by the symbol and is also based on the size of the PN code 127 for modulating the symbol. The PN code size corresponds to the size of the symbol, which dictates the number of bins needed to decode the symbol.

While FIG. 6B provides a general overview of a receiver 650 according to embodiments, the remaining figures detail various aspects and implementations of the receiver 650 to decode received signals 653 that may contain multiple packets.

Figure 7:
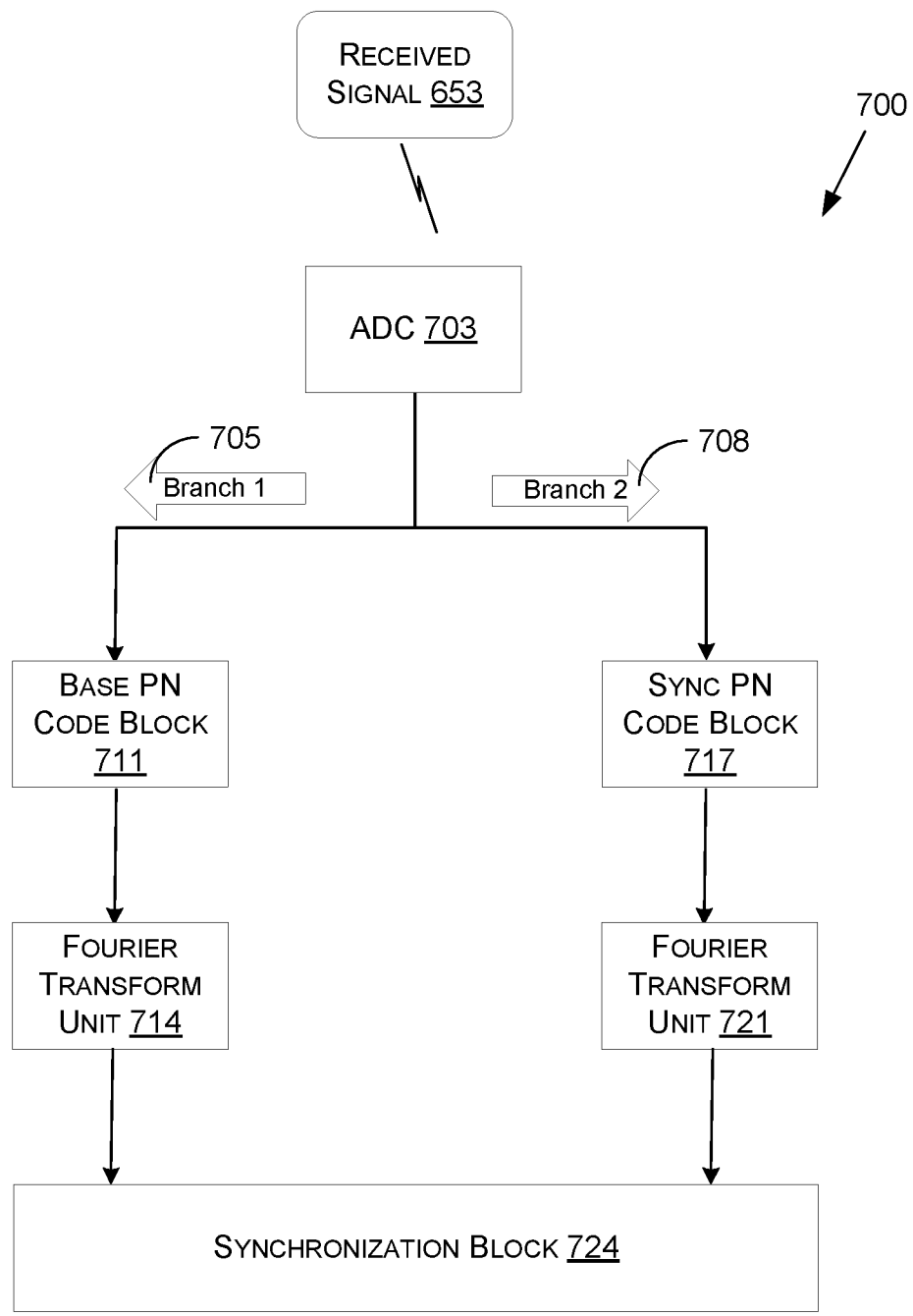
FIG. 7 is a functional block diagram illustrating one example of a synchronization circuit for a receiver according to various aspects of the present disclosure.

FIG. 7 is a functional block diagram illustrating the architecture of a synchronization circuit 700 of a receiver according to various aspects of the present disclosure. The synchronization circuit 700 may be part of the receiver 650 described in FIG. 6B. The synchronization circuit 700 receives received signals 653, which may include multiple packets originating from different transmitting devices. The received signals 653 may be sampled and digitized using an ADC 703. In this example, the ADC samples received signals before they are down converted, filtered, or otherwise processed. This way, the digital samples reflect the raw version of the received signals 653. The ADC 703 may be included in the RF front end. The digital samples may be stored in a buffer, such as, for example, the buffer 104 of FIG. 1. As described in FIG. 6A, packets that are transmitted to the receiver are encoded using one or more PN codes such as, for example, the PN code 127 of FIG. 1.

FIG. 7 shows an embodiment that receives a packet where the preamble is modulated by a first PN code and the syncword is modulated by a second PN code. FIG. 7 shows a process having a first branch 705 and a second branch 708, each of which uses a different PN code to identify a packet that may be stored in the buffer 104. The processes of the first branch 705 and the second branch 708 may be executed in parallel, serial, or may overlap in terms of execution time. In addition, these processes may occur in real-time as signals are received and stored in a buffer. The first branch 705 includes processes for identifying a location of a packet based on a preamble of the packet that is modulated by a first PN code.

For example, the first branch 705 includes a base PN code block 711 that may perform operations similar to those described with respect to FIG. 1. For example, the base PN code block 711 performs a sliding multiplication operation across the buffer by multiplying the first PN code with various subsets of samples in the buffer. The buffer may contain incoming signals that are sampled at a particular sample rate. The sliding multiplication operation may occur at the same sample rate to operate on each new sample received by the buffer.

Each sliding multiplication operation yields a multiplication product, where the first sample within the sliding window is multiplied by the first value of the first PN code, the second sample within the sliding window is multiplied by the second value of the first PN code, and so on. Thus, the multiplication product is the same length as the first PN code, which is also the same length of the samples within the sliding window.

The multiplication product is then converted into the time domain using a Fourier transformation unit 714. The input into the Fourier transformation unit 714 yields frequency-domain data that is analyzed to determine whether there are significant frequency components within a given multiplication product. To determine significant frequency components, each bin energy level is compared to a threshold. The bin energy level corresponds to the energy levels or amplitudes of constituent sine waves having frequencies that fall within the frequency range of the bin. For example, the time-domain version of the input signal may be represented as $f(x)$, which is a waveform having several different frequency components within a particular range of frequencies and a bandwidth. When transformed into the frequency domain, $f(x)$ may be represented as a summation of a series of sine waves having different amplitudes at different frequencies that span the frequency range. The frequencies of these constituent sine waves may be binned into contiguous frequency ranges (e.g., bins). The threshold may be defined in terms of standard deviations from the mean energy level. For example, the mean energy level may be calculated by averaging each bin energy level. The threshold may be set to be a minimum number of standard deviations from a mean energy level of all frequency components of the frequency-domain data. For example, the threshold may be set to be three or four standard deviations above the mean energy level. The threshold may also be based on a predetermined energy level above a measured noise level. The noise level may be obtained by obtaining noise statistics over a period of time. The noise level may be measured at the output of the Fourier transformation unit 714 to establish a baseline output. The threshold may be defined in terms of a predetermined number of standard deviations above the measured noise level. In some embodiments, rather than using a threshold, the max frequency bin among all bins at the FFT may be selected. This max frequency bin may be checked to determine if it repeats every symbol at a predetermined period of time. This indicates the presence of a preamble. Once the preamble is identified, a syncword may be identified at the end of the preamble. To decode the data in the packet, the max frequency bin following the preamble and syncword may be identified. The decoded data may be checked for containing any errors by uses an error detecting code of Cyclic Redundancy Check (CRC) bits that are contained in the packet.

When a bin has an energy level that exceeds a threshold, the time and bin energy level may be recorded. The time is the time associated with the sliding window, which covers a range of samples used to generate the multiplication product. As the sliding window continues to slide, and as subsequent multiplication products are generated, additional frequency components that are significant may be determined. If a repeating pattern emerges through the course of several multiplication operations, then it may be inferred that a preamble is detected. In other words, if a significant frequency component is above the threshold at predetermined time intervals as the window slides, then the significant frequency component is likely the result of a repeating preamble as opposed to noise. The presence of a preamble may be confirmed by detecting a syncword. By identifying a time position of a preamble and a syncword in the digital samples using the first PN code as discussed above, the location of the packet is known. For example, based on the protocol, the payload symbols of a packet are defined to occur after a predetermined amount of time following the syncword. Therefore, by determining the presence of a syncword and knowing its position in time, the location of the payload of the packet is known.

The second branch 708 involves a process similar to the first branch 705, but uses a second PN code in a sync PN code block 717 to detect syncwords. The use of a different PN code reduces the probability of detecting other interfering PN codes, which can lead to false triggering of the synchronization circuit. The second PN code may be selected to have low cross-correlation properties with respect to the first PN code used in the base PN code block 711. Cross-correlation refers to the degree that two signals or codes correlate with one another as one signal or code is shifted relative to the other. Strong cross-correlation suggests that two signals or codes have similar sequences regardless of location. The second PN code used in the sync PN code block 717 is selected to have low cross-correlation with the first PN code to improve the ability of distinguishing symbols within the samples of a given time window.

The second branch 708 includes a Fourier transformation unit 721 to determine frequency-domain data of input signals. This operates similar to the Fourier transformation unit 714 of the first branch 705. When a significant frequency component is present in the frequency domain data, this indicates a potential syncword.

The first branch 705 and the second branch 708 feed into a synchronization block 724. The synchronization block 724 performs a time and frequency synchronization using a preamble in a packet and the syncword. For example, the receiver may obtain time and frequency synchronization using several preambles a syncword at the beginning of each packet. The receiver may search for the known preamble and syncword symbols using PN code matched filters to identify a packet's syncword and one or more symbols within the packet. The output of the first branch 705 indicates the presence and timing of a preamble. The output of the second branch 708 indicates the presence of a syncword. The synchronization block 724 may then confirm that a detected syncword is positioned a predetermined period of time following a detected preamble. If this is the case, the synchronization block 724 determines the position of the payload that follows the syncword for the packet.

In addition to determining the timing of the payload of the packet, the synchronization block 724 determines the frequency offset. In some contexts, the frequency offset is the difference in frequency between the transmitted signal and the received signal. Frequency offset may arise from a Doppler effect, for example. The Doppler effect results from a transmitter moving relative to the receiver. The speed of movement may induce a frequency shift in the transmitted signal relative to the receiving device. Other causes for a frequency offset between a transmitter and receiver may be differences in the intrinsic properties of the transmitter and receiver. For example, differences in crystal oscillator frequencies between the transmitter and receiver may induce a frequency offset. To illustrate an example of a frequency offset, a transmission protocol may specify that the preamble comprises of a series of tones corresponding to bin number "786." If the preamble decoded by the receiver corresponds to bin number "788," a frequency offset may be determined based on the difference between the frequency components of the received preamble and the frequency components of the expected preamble. Similarly, a frequency offset may be determined based on the difference between the frequency components of the received syncword and the frequency components of the expected syncword.

While FIG. 7 shows the use of a first PN code in a first branch 705 and a second PN code in a second branch 708, other embodiments are contemplated. For example, one PN code may be used to modulate both the preamble and the syncword. In another example, multiple PN codes may be used to modulate different symbols of a preamble.

Figure 8:
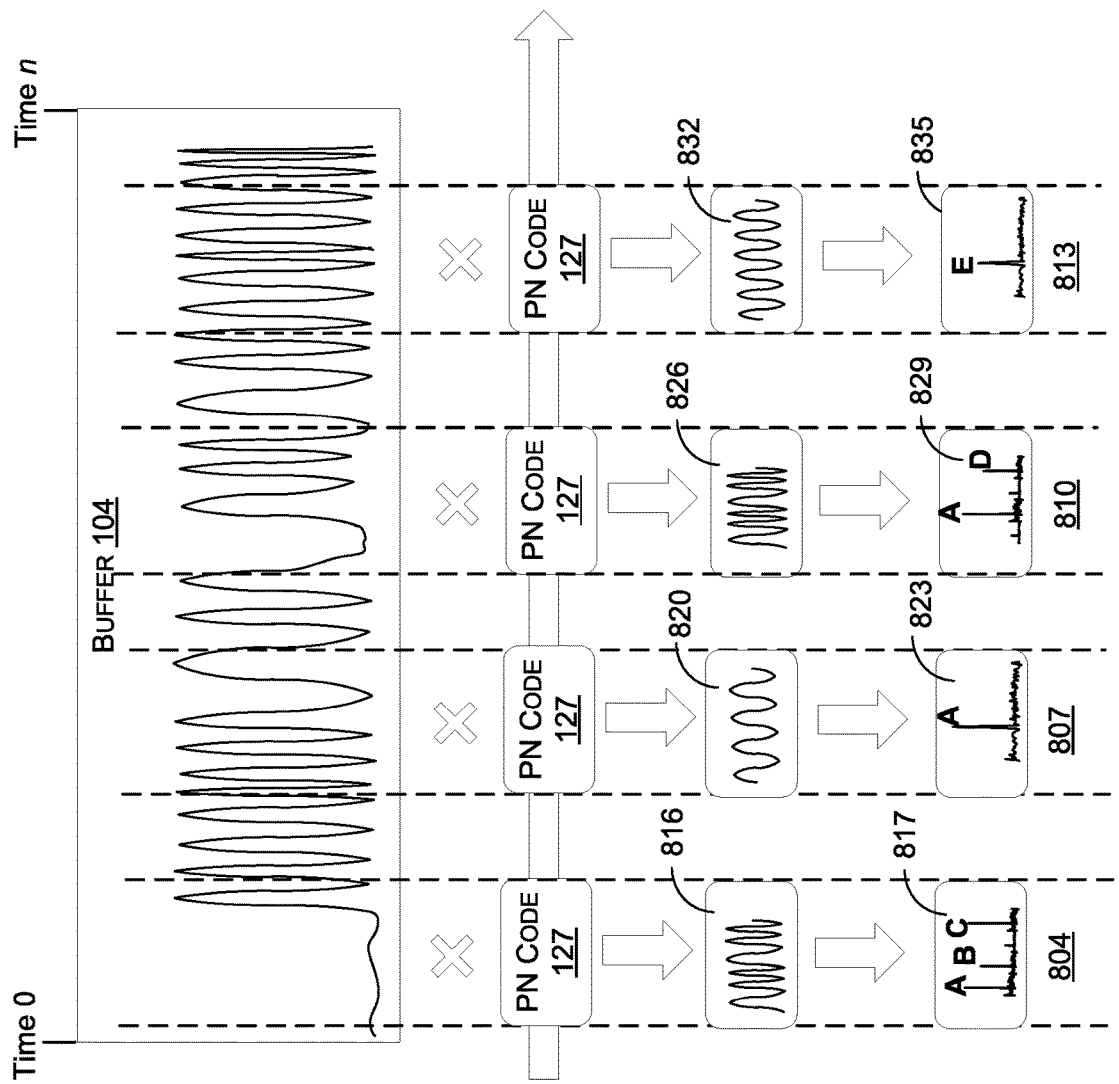
FIG. 8 is a diagram illustrating example operations of a receiver according to various aspects of the present disclosure.

FIG. 8 is an illustration showing the operations of a receiver according to various aspects of the present disclosure. FIG. 8 provides an example that represents the multiplication operations described with respect to FIG. 7 to determine the timing and frequency offset of a packet. Specifically, FIG. 8 illustrates using the PN code 127 to detect time positions of packets within the buffer 104. The buffer 104 records received signals (e.g., the received signals 653 of FIG. 6B) as a series of digital samples for a window of time. The digital samples may represent a raw signal before it has been shifted to a baseband signal. The received signals may be sampled at a particular sample rate and stored in the buffer 104 in real time. For example, if the sample rate is one microsecond, then the ADC may sample the received signals every one microsecond and store the sample in the buffer every one microsecond. The digital samples may contain multiple packets, where some packets overlap in time. FIG. 1 provides an example of how the buffer 104 may contain multiple packets.

The PN code 127 slides along a time direction of the buffer 104 so that subsets of the digital samples in the buffer 104 are pointwise multiplied by the PN code 127. For example, the PN code 127 may slide as one or more new samples are stored in the buffer 104. Assuming that samples arrive at the buffer 104 every 1 microsecond, then, at every 1 microsecond, a pointwise multiplication between the subset of samples in the sliding window and the PN code would be performed. The pointwise multiplication would thus be performed on overlapping subsets of samples as one new sample is added to each subset and the oldest sample is dropped from each subset. The length of the sliding window (in terms of time) should be greater than the duration of a symbol so as to be able to detect a symbol within the sliding window. For example, if a symbol duration is 100 microseconds and the sample rate is 1 microsecond, the sliding window should span a length that encompasses a subset of samples that exceeds 100 samples. This process allows the buffer 104 to be scanned for PN code-modulated syncwords and PN code-modulated preambles. While several multiplication operations may be performed, FIG. 8 shows a first multiplication operation 804, a second multiplication operation 807, a third multiplication operation 810, and fourth multiplication operation 813. Several multiplication operations are performed to scan for frequency patterns that repeat over time. FIG. 8 provides an example of detecting repeating preambles and a syncword by multiplying different subsets of samples with the PN code 127.

The PN code 127 and subset of samples may be represented as vectors having the same length. Thus, when multiplying the PN code 127 with a subset of digital samples in the buffer 104, each element of a first vector is pointwise multiplied by corresponding elements of a second vector, and the multiplication yields a multiplication product that is a vector having the same length as the input vectors. For example, in the first multiplication operation, the PN code 127 is applied to the beginning of the buffer 104. The multiplication operation 804 uses the PN code 127 as a multiplier and a beginning subset of digital samples in the buffer 104 as the multiplicand. This yields a first multiplication product 816. The multiplication product 816 may correspond to a tone signal. For example, a tone signal contains a frequency component corresponding to a symbol of a packet.

Next, a Fourier transformation of the multiplication product is performed to determine whether there are any significant frequency components. A significant frequency component may indicate the presence of a symbol, or it may be a result of noise or interference. In addition, several multiplication operations may need to be performed to determine whether significant frequency components are preambles of the same packet and/or whether they should be disregarded as noise. In the example of FIG. 8, the first multiplication product 816 is converted into first frequency-domain data 817 using a Fourier transformation unit. As shown in this example, the first multiplication product 811 includes multiple significant frequency components indicated as "A," "B," and "C." The frequency-domain data 817 may include several bins (e.g., frequency ranges), each bin having a bin energy level. The bin energy level correlates with the amplitude of the frequencies within a bin. For example, if the bin represents a frequency range of 500-510 Hz, the bin energy level is based on combining the amplitudes of each sine wave having frequencies within the range of 500-510 Hz. The energy level is proportional to the square of the amplitude of a sine wave. In the context of an FFT operation, the sine waves that make up the 500-510 Hz range may be discretized into a single sine wave such that the bin energy level is equal to the energy level of the discretized sine wave. Significant frequency components are determined based on the bins that have energy levels (e.g., frequency values) that exceed a threshold level (e.g., over three standard deviations above the mean energy level of frequency components in the frequency-domain data or above a noise level). In other embodiments, instead of a threshold, the bin having the maximum bine energy level may be selected.

The significant frequency components A, B, and C of the frequency-domain data 817 may be determined based on applying a threshold to each bin energy level in the frequency-domain data 817. At this point, the receiver may not have enough information to determine whether the significant frequency components A, B, and C each represent symbols, interference, or noise. Moreover, the receiver may not have enough information to determine whether the significant frequency components A, B, and C are associated with the same packet or are symbols of different packets. To obtain more information, additional subsets of the samples need to be scanned. The receiver may store data indicating the detection of significant frequency components A, B, and C and the time they were detected. For example, the receiver may record the bins or frequencies associated with each of the significant frequency components A, B, and C along with the time associated with the time window in which they were detected.

Next, the PN code 127 is applied to a second subset of digital samples as part of the second multiplication operation 807. Here, the PN code 127 is pointwise multiplied by the second subset of digital samples to yield a second multiplication product 820. The second multiplication product 820 is converted into second frequency-domain data 823 to determine whether the second subset of digital samples contains significant frequency components. Here, the second frequency-domain data 826 includes one significant frequency component, labeled as A. Thus, in the second multiplication operation 807, frequency component A is detected again, but frequency components B and C are not detected. Assuming that the time difference between the first and second multiplication operations 804, 807 is similar to the time difference between two preambles of the same packet, this suggests that frequency component A is potentially a repeating preamble. Moreover, because frequency components B and C were not detected again, this suggests that frequency components B and C are not preambles.

Next, the PN code 127 is applied to a third subset of digital samples as part of the third multiplication operation 810. Here, the PN code 127 is pointwise multiplied by the third subset of digital samples to yield a third multiplication product 826. The third multiplication product 826 is converted into second frequency-domain data 829 to determine whether the third subset of digital samples contains significant frequency components. Here, the third frequency-domain data 829 includes two significant frequency components, labeled as A and D. Thus, in the third multiplication operation 810, frequency component A is detected yet again, frequency components B and C are not detected, and a new frequency component D is detected. Assuming that the time difference between the second and third multiplication operations 807, 810 is similar to the time difference between two preambles of the same packet, this suggests that frequency component A is potentially a repeating preamble. Once a significant frequency component (e.g., frequency component A) repeats a particular number of times at a predefined interval, the receiver may consider that the repeating, significant frequency component is a preamble. The receiver may then confirm the detection of a preamble by scanning for a syncword that appears at a predetermined amount of time following the last preamble.

Next, the PN code 127 is applied to a fourth subset of digital samples as part of the fourth multiplication operation 813. Here, the PN code 127 is pointwise multiplied by the fourth subset of digital samples to yield a fourth multiplication product 832. The fourth multiplication product 832 is converted into second frequency-domain data 835 to determine whether the fourth subset of digital samples contains significant frequency components. Here, the fourth frequency-domain data 835 includes one significant frequency component, labeled as E. Thus, in the fourth multiplication operation 814, frequency component E is detected at a predetermined period of time following a repeating series of significant frequency components. Assuming that the time difference between the third and fourth multiplication operations 810, 813 is similar to the time difference between the last preamble and the syncword of the same packet, this suggests that frequency component E is a syncword following a repeating preamble. Moreover, the syncword has a different bin value or frequency than a preamble to differentiate the preamble from the syncword. However, the difference between the bin value or frequency of the preamble and the bin value or frequency of the syncword may be defined by the transmission protocol. For example, if the preambles are encoded to be in bin number "345" and the syncword is encoded to be in bin number "435," then the receiver may confirm that a significant frequency component is a received syncword if it has a bin number that is 100 more than the bin number of a detected preamble. In this respect the receiver may confirm that a significant frequency component is a syncword if the difference in bin number/frequency between a detected preamble and the significant frequency component is equal to a predetermined or expected offset specified by the transmission protocol. In addition, the receiver may determine a frequency offset based on the bin number/frequency of the preamble or syncword and the expected bin number/frequency of the preamble or syncword, as defined by the protocol. Assume again that preamable symbols are encoded to be in bin number "345" and the syncword is encoded to be in bin number "435." Then, if the detected preamble (e.g., frequency component A) has a bin number of 347 and the detected syncword (e.g., frequency component E) has a bin number of 437, then a frequency offset of two bins may be determined. The frequency offset resulting from transmission (e.g., any Doppler effect), then, is an upshift of two bins. Subsequent tone signals (e.g., packet tone signals) may be decoded according to determining the frequency offset of two bins. In addition, the frequency offset between the preamble and the syncword is 90 bins. If a series of tone signals is detected as a preamble and the following tone signal is 90 bins lower than the bin number of the preamble, then the second tone signal is confirmed as a syncword.

This process in FIG. 8 shows how to detect a time position of a preamble and syncword of a first data packet by detecting repeating frequency components spaced at a predetermined amount of time apart. Based on the transmission protocol, the receiver determines the time position of the first symbol of the payload of a packet based on the detected syncword. The transmission protocol may define the period of time between the syncword and the first payload symbol.

Figure 9:
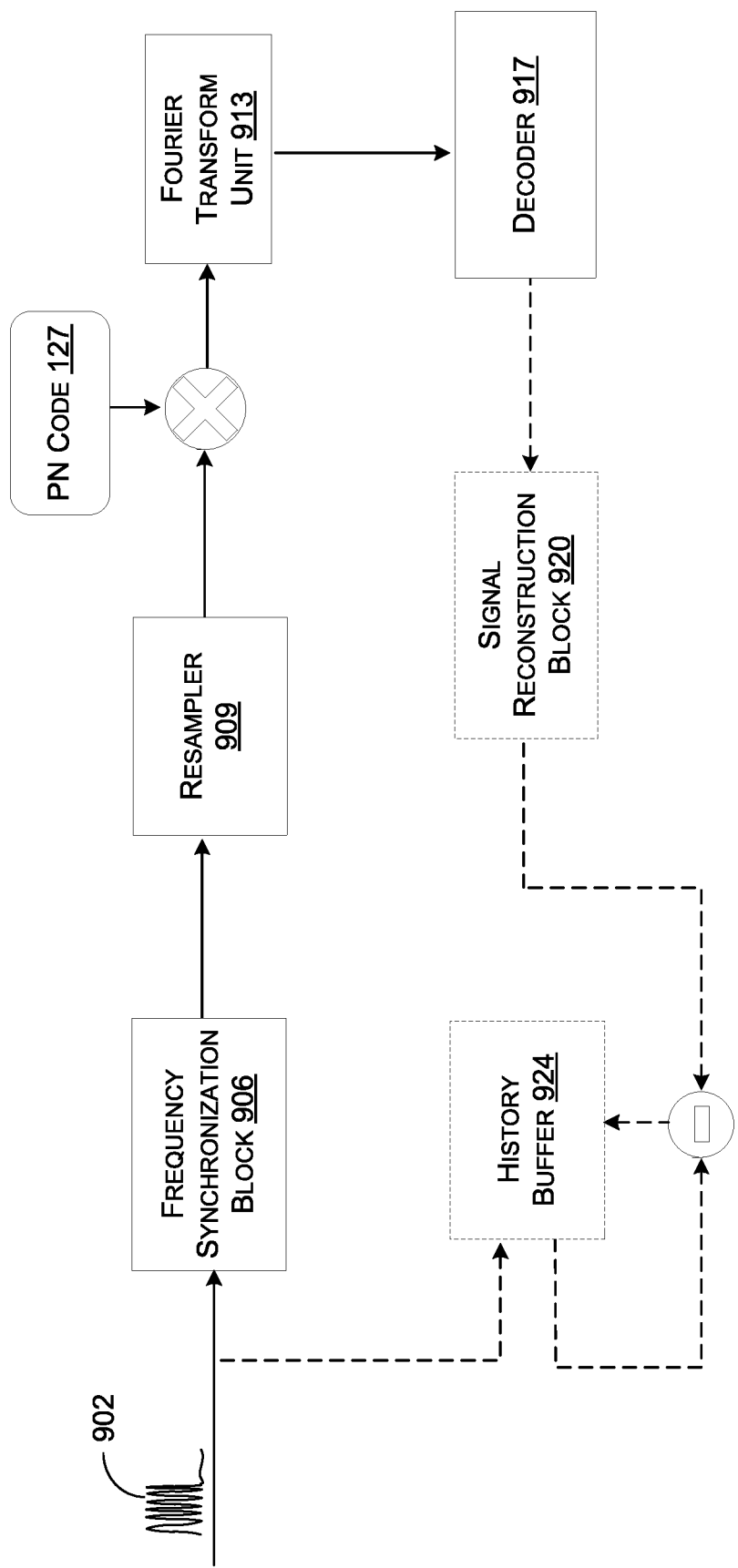
FIG. 9 is a functional block diagram illustrating one example of the architecture of a receiver according to various aspects of the present disclosure.

FIG. 9 is a functional block diagram illustrating the architecture of a receiver according to various aspects of the present disclosure. FIG. 9 provides an example that represents the operations for decoding a payload of a packet once the packet is identified using, for example, the operations discussed above with respect to FIGS. 7 and 8. Specifically, FIG. 9 illustrates using the PN code 127 to decode a packet once the time position of the packet within a history buffer 924 is known. As discussed in FIG. 8, the buffer 104 is scanned for a PN-modulated syncword to identify the location of a packet.

The example of FIG. 9 shows the arrangement of components and the flow of operations between various components. Once a packet is located in the buffer using the time and frequency synchronization described in FIG. 8, the receiver can begin decoding the symbol(s) of the payload of the identified packet. In this respect, FIG. 9 shows a block diagram that may represent a decoding circuit of the receiver.

The history buffer 924 contains digital samples of received signals 902. The digital samples in the history buffer 924 are multiplied by a complex exponential set to the frequency offset between the transmitting device and the receiving device. This is performed by the frequency synchronization block 906. The frequency offset is discovered by the synchronization circuit and fed to the decoding block. The complex exponential may be represented using the following expression: $e^{-j*2*\pi*fk*t}$. Here, the variable "fk" represents the frequency offset calculated by the receiver upon the receiving device and transmitting device establishing communication, and "t" represents the time variable. The frequency synchronization block 906 re-centers the digital samples in frequency.

A resampler 909 generates optimized samples for the packet using the raw digital samples originally stored in the history buffer 924. The resampler 909 may perform a lowpass filter operation on the section of the history buffer 924 that contains the identified packet. The resampler 909 may reduce the sampling rate to a bandwidth of the PN code 127. In this respect, the resampler 909 ensures that the digital samples representing each symbol of the identified packet are formatted as a vector having the same length as the vector of the PN code. This allows two vectors of the same length to produce a multiplication product being a vector of the same length as the inputs.

The subset of digital samples, once resampled, is then multiplied by the PN code 127 at the correct time so that the symbol represented by the digital samples overlaps with the PN code 127. The multiplication product yields a tone signal that represents information (e.g., the information 603 of FIG. 6A) encoded by a transmitter (e.g., the transmitter 600 of FIG. 6A).

The tone signal is provided as an input into the Fourier transformation unit 913 to convert the tone signal into the frequency domain. A decoder 917 determines the information encoded in the tone signal. For example, the frequency bin from which the tone signal was obtained may be deterministically mapped to a series of bits that represent the encoded data. This operation is performed for each symbol in the identified packet until the packet is decoded.

A signal reconstruction block 920 may also be included in the receiver architecture in some embodiments. The signal reconstruction block 920 may convert the identified packet into a reconstructed time-domain signal. This process seeks to estimate the packet when it was transmitted and before it was received with any potential interference. The signal reconstruction block 920 may subtract the reconstructed time-domain signal from the digital samples to generate updated digital samples. For example, the reconstruction block 920 removes an estimated version of the packet from the digital samples in the history buffer 924, thereby reducing the amount of data contained in the history buffer 924. This allows additional packet(s) to be extracted from the updated digital samples.

The iterative subtraction operation effectively removes the data representing a packet from the history buffer 924 to allow the detection of additional packets. For example, the history buffer 924 contains samples of received signals 902, where the samples represent packets that may potentially overlap in time. A reconstructed time-domain signal that represents a successfully decoded packet may be subtracted from this history buffer 924 using a point-by-point subtraction starting from the point in time corresponding to the beginning of the reconstructed packet. In other words, a subset of samples of the history buffer 924 corresponding to the reconstructed packet's location undergo a point-by-point subtraction using the reconstructed packet. Thus, the reconstructed packet may be treated as a set of samples representing the reconstructed packet. While the length of the history buffer stays the same, the number of packets it represents decreases by one for each packet subtraction.

Figure 10:
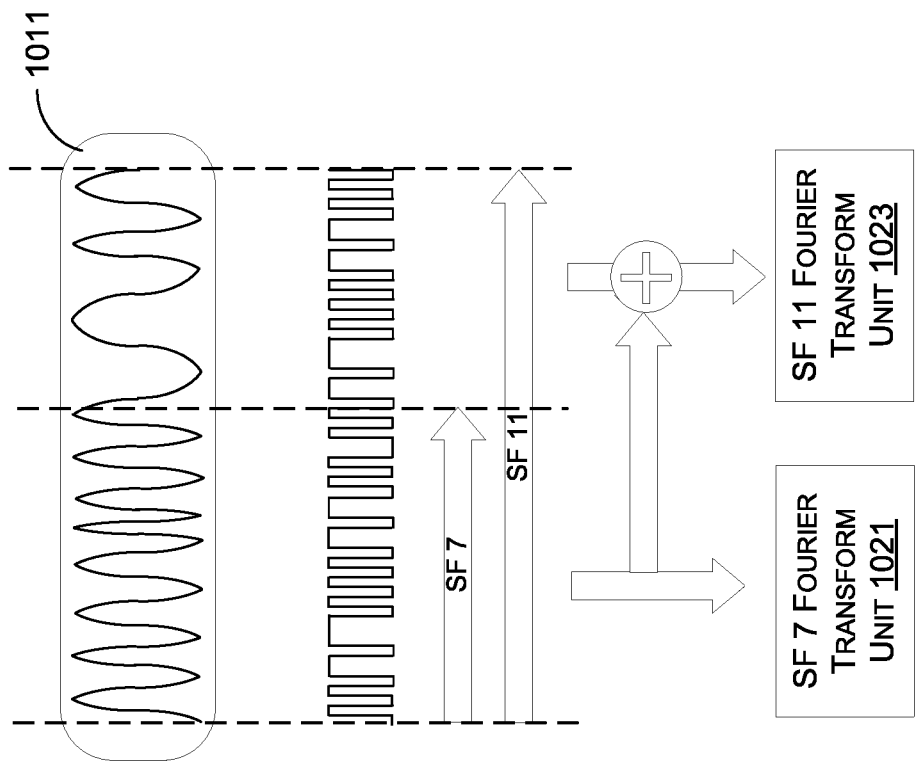
FIG. 10 is a diagram illustrating one example of operation for a multi-rate receiver according to various aspects of the present disclosure.

FIG. 10 is a diagram illustrating one example of operation for a multi-rate receiver according to various aspects of the present disclosure. In some embodiments, the size of the PN code 127 correlates to the SF of the symbol to be decoded and the number of frequency bins used to decode the symbol. For example, the amount of data contained in the symbol leads to the symbol's SF. For example, if at least seven bits are required to encode the data, then the symbol may have SF=7, and if at least eleven bits are required to encode the data, then the symbol may have SF=11. When decoding the symbol, the Fourier transformation unit uses a number of bins that correspond to the SF. However, in various embodiments, packets may be encoded with different spreading factors.

FIG. 10 depicts an embodiment where the PN code 127 is truncated to support a minimum spreading factor. The PN code 127 may be truncated, for example, to a PN code size for higher rate packets (e.g., packets with smaller SFs). FIG. 10 shows a waveform in the time domain of any received signal 1011 that is subject to be decoded. The received signal 1011 may be encoded using various spreading factors. The example of FIG. 10 shows a received signal having an SF of 7 and an SF of 11. The received signal may represent a syncword, a symbol, a chirp, or another portion of a packet.

When decoding the received signal 1011, regardless of the spreading factor, the same block that performs the multiplication using the PN code 127 can be used to decode the received signal 1011. For example, the multiplication performed using the PN code 127 may be divided into two segments of multiplication operations. The first multiplication operation may be performed for a first section of the received signal 1011. The length of the section may be set according to the smallest SF supported by the receiver. The second multiplication operation handles the remainder of the received signal 1011. This allows the decoding process to decode multiple data rates in parallel.

For example, the smallest SF supported by a receiver may be 7. In this case, the received signal 1011 having an SF of 7 is decoded using a Fourier transformation unit configured for data input lengths corresponding to an SF of 7. If the received signal has an SF greater than 7, (e.g., an SF equal to 11), the first portion of the received signal 1011 is decoded using the same Fourier transformation block configured for data input lengths corresponding to an SF of 7. However, to decode the remainder of the received signal 1011, the results from the operation relating to the first portion are fed into the Fourier transformation block to process the remainder of the received signal 1011.

To further build on the example above, the first portion of received signals 1011 are handled by a Fourier transformation unit 1021 that generates frequency-domain data according to a bin count based on a spreading factor of 7. For received signals 1011 having an SF greater than 7, this result is fed into a second Fourier transformation unit 1023 that performs the operations to complete the decoding of the received signal 1011. Thus, in this configuration, the first Fourier transformation unit 1021 and the second Fourier transformation unit 1023 are arranged in parallel to decode a symbol with a relatively larger spreading factor in parallel.

Figure 11:
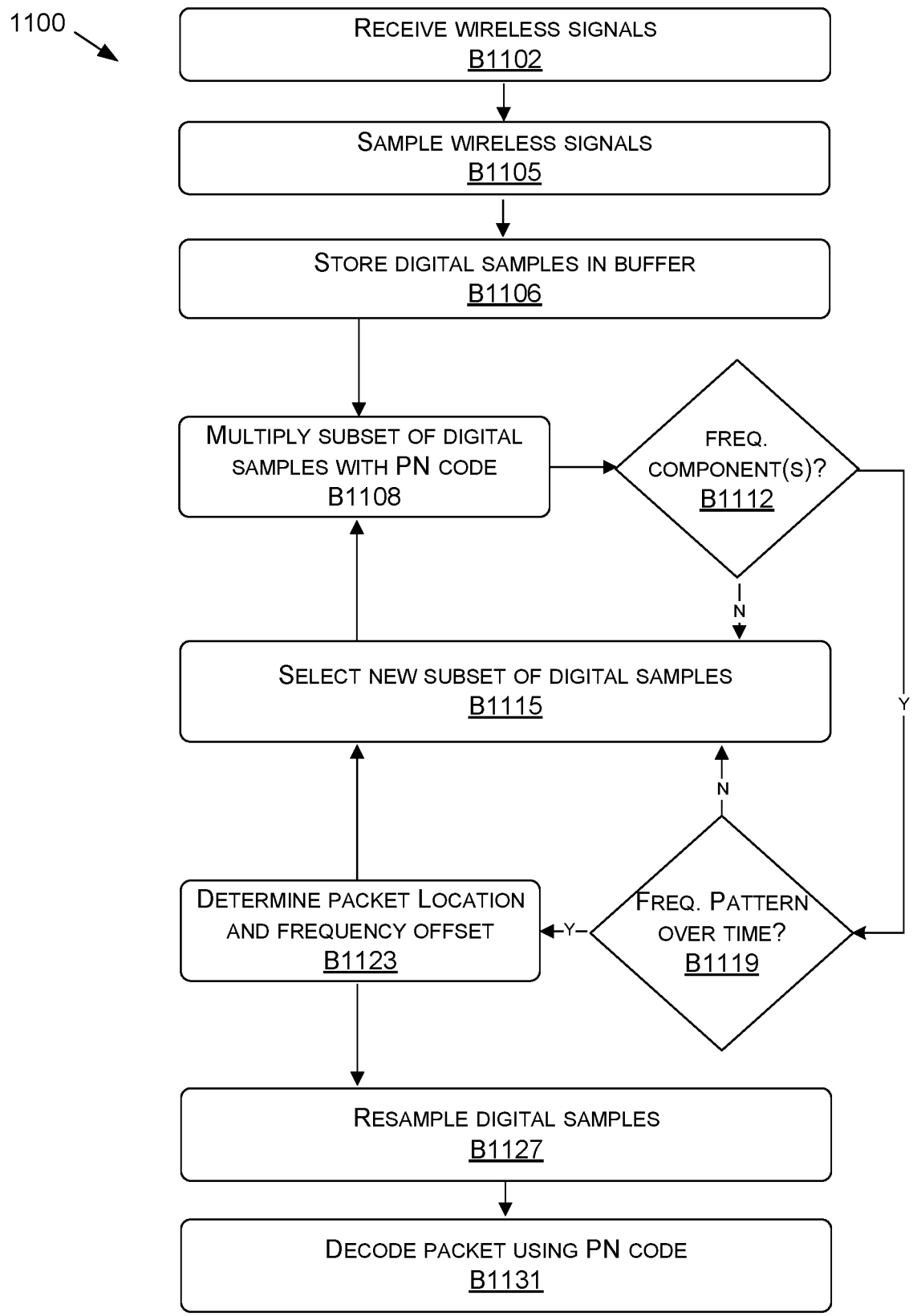
FIG. 11 is a flowchart illustrating an example process for decoding a packet according to various aspects of the present disclosure.

FIG. 11 is a flowchart illustrating an example process 1100 of decoding a packet according to various aspects of the present disclosure. At block B1102 wireless signals are received. The received signals may include the received signals 653 of FIG. 6B, or any other electromagnetic signals received by a receiver. The received signals may be received by an RF front end of a receiver. The received signals may include one or more packets that are generated and transmitted by transmitters (e.g., the transmitter 600 of FIG. 6A). The received signals may include a first wireless signal received from a first transmitter, and a second wireless signal received from a second transmitter. The first wireless signal may contain a first packet and the second wireless signal may contain a second packet. The first packet and second packet may be received at or near the same time such that they overlap in terms of reception time.

At block B1105 the received signals are sampled. The process 1100 may involve an ADC to convert analog signals into digital samples at a predefined sampling rate. At B1106 the digital samples are stored in a buffer such as, for example the buffer 104 of FIG. 1. The buffer may be set to a predetermined window size that exceeds the length of multiple packets. For example, the buffer size may be set to capture multiple packets that may be received around the same point in time.

At block B1108 subset(s) of the digital samples are multiplied with a PN code such as, for example, the PN code 127 of FIG. 1. For example, block B1108 may be similar to the multiplication operations described above with respect to FIG. 8. The PN code may slide in a direction (e.g., forward or backward) along the digital samples in the buffer. In this respect, the process 1100 performs a scan of preamble symbols and/or a syncword within the digital samples. This generates multiplication products as the PN code is multiplied to different segments of the digital samples.

At block B1112 it is determined whether the multiplication product contains a significant frequency component. A significant frequency component is determined by converting the multiplication product into the frequency domain (e.g., using a Fourier transformation unit) and evaluating if any frequency components are significant. For example, FIG. 8 provides an example of applying a threshold to determine if there any significant frequency components in the PN-code demodulated data.

If there is not a significant frequency component, then, at block B1115, new subsets of digital samples are continued to be selected. For example, this may involve shifting or sliding the range section of the digital samples to be multiplied with the PN code. Stated another way, new samples arriving at the buffer move into the window and are subject to additional multiplication operations.

If there is a significant frequency component(s) in the frequency-domain data, then, at block B1119, a check is made as to whether detected significant frequency component(s) follow a pattern. For example, the pattern may be the presence of a significant frequency component occurring at a predetermined interval of time. The predetermined interval of time is defined by the transmission protocol. This type of pattern may correspond to a repeating preamble, where preambles repeat at a time interval specified by the transmission protocol. In addition, the pattern may be a repeating preamble followed by a syncword. The example in FIG. 8 shows the detection of a pattern where a significant frequency component (labeled as "A") repeats three times followed by a different, significant frequency component (labeled as "E"). The process 1100 continues at block B1115 if no pattern is detected.

At block B1123 a packet location and frequency offset are determined. The process 1100 uses the detected pattern to identify a preamble and/or syncword. For example, as discussed in the example of FIG. 8, a significant frequency component may be deemed a syncword if it has a bin number/frequency that is offset from the bin number/frequency of the preamble by a predetermined amount, the predetermined amount being specified by the transmission protocol.

Based on the presence of the preamble and/or syncword, the process 1100 infers that a packet is present. The payload of the packet may be determine based on adding a predetermined amount of time following the syncword and/or preamble. The frequency offset may be determined as discussed above with respect to FIGS. 7 and 8. Thereafter, the process 1100 continues at block B1115 to continue scanning for additional symbols.

At block B1127, the subset of the digital samples are resampled. For example, the portion of the buffer that contains the identified packet may be resampled to achieve a sample rate and bandwidth for decoding the packet using the PN code. For example, resampling may involve downsampling the digital samples stored in the buffer to a target sample rate. Downsampling reduces the number of samples, thereby reducing the number of point-by-point operations needed to decode packets by way of PN-code multiplication. In addition, the bandwidth may be limited to match the bandwidth of frequencies expected in the payload. For example, the payload may be generated to be within a particular bandwidth. Resampling may remove frequencies that are not needed for decoding the payload. In addition, the digital samples representing the identified packet may have their frequency re-centered prior to resampling.

At block B1131, the packet is decoded using the PN code. For example, each symbol in the packet may be multiplied by the PN code to generate a multiplication product. The multiplication product is a tone that represents a symbol that is demodulated based on the PN code. The tone signal is converted into frequency-domain data, and the bin number of the tone corresponds to the binary data that is encoded by the tone signal. In this respect, the frequency-domain data has a predetermined number of frequency bins. Encoded data is decoded from the bin number or other frequency value of the largest frequency component(s). In addition, the size of the PN code correlates to the predetermined number of frequency bins. That is, the PN code is selected to match the length of the symbol, which is defined by the spreading factor.

Figure 12:
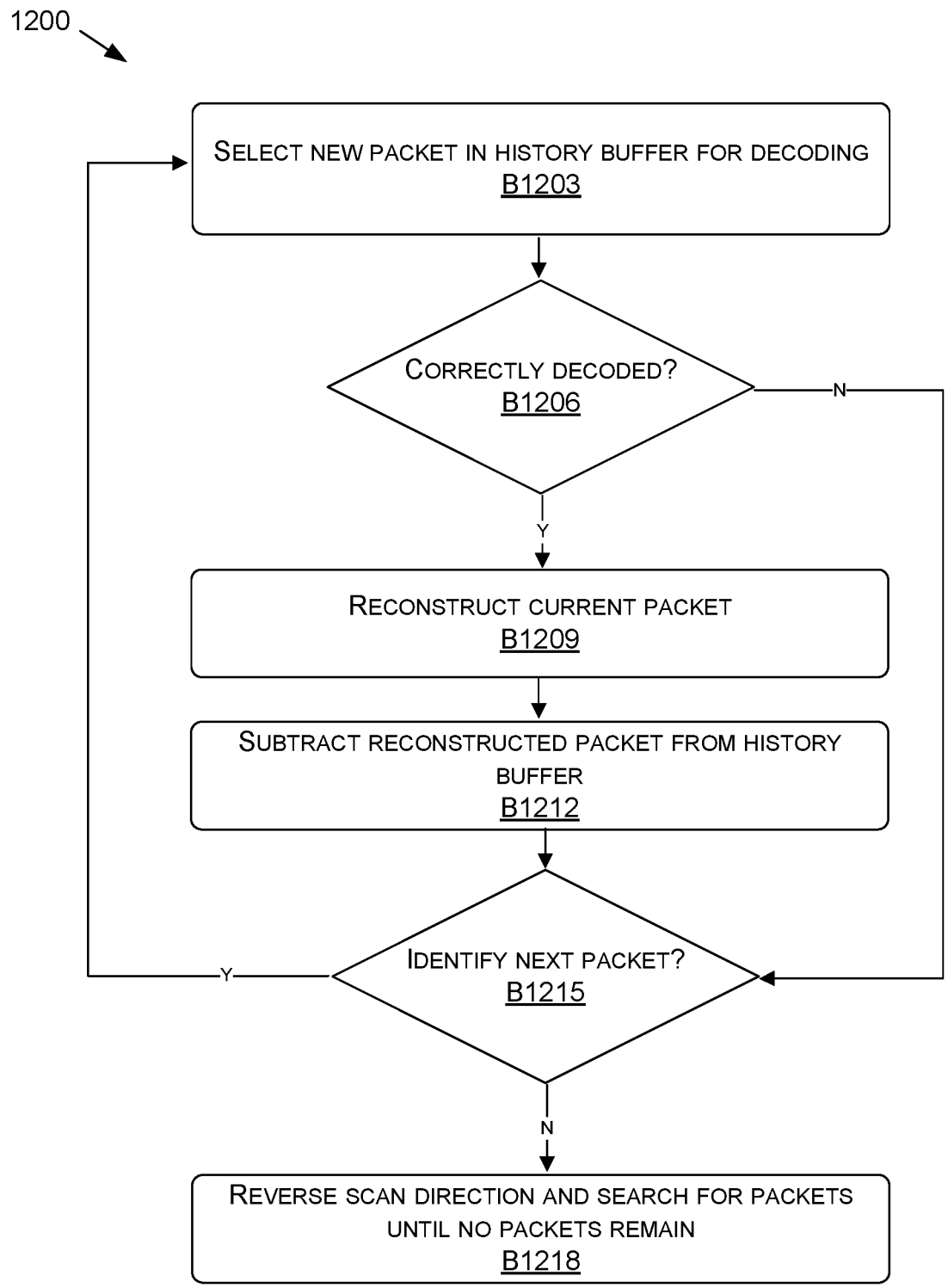
FIG. 12 is a flowchart illustrating an example iterative subtraction process for decoding overlapping packets in a history buffer according to various aspects of the present disclosure.

FIG. 12 is a flowchart illustrating an example iterative subtraction process 1200 for decoding overlapping packets in a history buffer according to various aspects of the present disclosure. At block B1203, a new packet in a history buffer for decoding is selected. The history buffer may be the history buffer described with reference to FIG. 9. The packet may be identified by scanning for a PN code-modulated syncword. That is, the syncword of the packet is modulated by a PN code prior to transmission and upon reception, the time position of the syncword is identified within the history buffer 104 by multiplying the PN code to segments of the history buffer.

At block B1206 a check is made to determine if the packet is correctly decoded. For example, if a symbol is not identifiable or if a tone signal from the symbol cannot properly be generated, then the packet may be incorrectly decoded.

If the packet is properly decoded, then at block B1209, the current packet is reconstructed. This may be similar to a transmitter that encodes the decoded information onto chirp signals and then multiplies it by a PN code. The process 1200 may involve converting the encoded signal so as to estimate the wireless signal that was emitted from the transmitter that sent the received packet.

At block B1212 the reconstructed packet is subtracted from the history buffer. For example, the position is located within the history buffer where the current packet was identified, and then the reconstructed packet is subtracted at that location. This generates an updated history buffer that estimates the received signal as if the packet was not transmitted. This improves the ability to identify additional packets in the history buffer.

At block B1215, the next packet is identified within the history buffer. If the current packet was not properly decoded as discussed above with respect to block 1206 or whether it was, the next packet is identified. The next packet is identified by scanning the updated history buffer for a syncword. The process then branches back to block B1203 if the next packet is identified.

If the packet is not identified, then, at block B1218, the scan direction is reversed and a next packet is located. This search is repeated until no packets remain. The process 1200 may involve setting a direction flag to control the direction of the scan. This flag may be updated depending on whether any packets are identified within the history buffer. Each time a packet is identified and properly decoded, the history buffer is updated to estimate the removal of the packet, thereby reducing the number of potential packets contained in the history buffer.

The processes 1100, 1200 are illustrated as a collection of blocks in logical flow graphs, which represent a sequence of operations that may be implemented in hardware, software, or a combination thereof. In the context of software, the blocks represent computer-executable instructions stored on one or more computer-readable storage media that, when executed by one or more processors, perform the recited operations. Generally, computer-executable instructions include routines, programs, objects, components, data structures, and the like that perform particular functions or implement particular abstract data types. The order in which the operations are described is not intended to be construed as a limitation, and any number of the described blocks may be combined in any order and/or in parallel to implement the processes. Additionally, any number of the described blocks may be optional and eliminated to implement the processes.

The features of the present embodiments described herein may be implemented in digital electronic circuitry, and/or in computer hardware, firmware, software, and/or in combinations thereof. Features of the present embodiments may be implemented in a computer program product tangibly embodied in an information carrier, such as a machine-readable storage device, and/or in a propagated signal, for execution by a programmable processor. Embodiments of the present method steps may be performed by a programmable processor executing a program of instructions to perform functions of the described implementations by operating on input data and generating output.

The features of the present embodiments described herein may be implemented in one or more computer programs that are executable on a programmable system including at least one programmable processor coupled to receive data and/or instructions from, and to transmit data and/or instructions to, a data storage system, at least one input device, and at least one output device. A computer program may include a set of instructions that may be used, directly or indirectly, in a computer to perform a certain activity or bring about a certain result. A computer program may be written in any form of programming language, including compiled or interpreted languages, and it may be deployed in any form, including as a stand-alone program or as a module, component, subroutine, or other unit suitable for use in a computing environment.

Suitable processors for the execution of a program of instructions may include, for example, both general and special purpose processors, and/or the sole processor or one of multiple processors of any kind of computer. Generally, a processor may receive instructions and/or data from a read only memory (ROM), or a random-access memory (RAM), or both. Such a computer may include a processor for executing instructions and one or more memories for storing instructions and/or data.

Generally, a computer may also include, or be operatively coupled to communicate with, one or more mass storage devices for storing data files. Such devices include magnetic disks, such as internal hard disks and/or removable disks, magneto-optical disks, and/or optical disks. Storage devices suitable for tangibly embodying computer program instructions and/or data may include all forms of non-volatile memory, including for example semiconductor memory devices, such as EPROM, EEPROM, and flash memory devices, magnetic disks such as internal hard disks and removable disks, magneto-optical disks, and CD-ROM and DVD-ROM disks. The processor and the memory may be supplemented by, or incorporated in, one or more ASICs (application-specific integrated circuits). For example, each block or processing segment may be implemented using a stand-alone special purpose device such as, for example, a digital signal processor, a processing-in-memory device, or a specialized processor.

As used herein, the phrases "at least one of A, B and C," "at least one of A, B, or C," and "A, B, and/or C" are synonymous and mean logical "OR" in the computer science sense. Thus, each of the foregoing phrases should be understood to read on (A), (B), (C), (A and B), (A and C), (B and C), and (A and B and C), where A, B, and C are variables representing elements or features of the claim. Also, while these examples are described with three variables (A, B, C) for ease of understanding, the same interpretation applies to similar phrases in these formats with any number of two or more variables.

The above description presents the best mode contemplated for carrying out the present embodiments, and of the manner and process of practicing them, in such full, clear, concise, and exact terms as to enable any person skilled in the art to which they pertain to practice these embodiments. The present embodiments are, however, susceptible to modifications and alternate constructions from those discussed above that are fully equivalent. Consequently, the present invention is not limited to the particular embodiments disclosed. On the contrary, the present invention covers all modifications and alternate constructions coming within the spirit and scope of the present disclosure. For example, the steps in the processes described herein need not be performed in the same order as they have been presented, and may be performed in any order(s). Further, steps that have been presented as being performed separately may in alternative embodiments be performed concurrently. Likewise, steps that have been presented as being performed concurrently may in alternative embodiments be performed separately.

What is claimed is:

1. A method decoding a data symbol, comprising:
   receiving wireless signals;
   digitally sampling the wireless signals to generate digital samples;
   multiplying a first subset of the digital samples with a Pseudo-Noise (PN) code to generate a first tone signal;
   transforming the first tone signal to the frequency domain to generate first frequency-domain data;
   multiplying a second subset of the digital samples with the PN code to generate a second tone signal;
   transforming the second tone signal to the frequency domain to generate second frequency-domain data;
   determining that a frequency offset between a frequency component in the first frequency-domain data and a frequency component in the second frequency-domain data matches an expected frequency offset;
   multiplying a third subset of the digital samples with the PN code to generate a third tone signal;
   transforming the third tone signal to the frequency domain to generate third frequency-domain data;
   determining the third frequency-domain data includes a frequency component having an energy level above a threshold;
   identifying a bin number of the frequency component in the third frequency-domain data; and
   determining a bit sequence from the bin number.

2. The method of claim 1, wherein determining the third frequency-domain data includes the frequency component having the energy level above the threshold comprises determining that the energy level of the frequency component is at least a minimum number of standard deviations from at least one of a mean energy level of all frequency components of the third frequency-domain data or a noise level.

3. A method, comprising:
   multiplying a set of digital samples with a Pseudo-Noise (PN) code to generate a tone signal;
   transforming the tone signal to the frequency domain to generate frequency-domain data;
   determining that the frequency-domain data includes a frequency component having an energy level that is at least a minimum number of standard deviations from at least one of a mean energy level of all frequency components of the frequency-domain data or a noise level;
   determining a frequency value of the frequency component; and
   decoding encoded data from the frequency value.

4. The method of claim 3, wherein the set of digital samples is a first set of digital samples, the tone signal is a first tone signal, the frequency-domain data is first frequency-domain data, the frequency component is a first frequency component, and the frequency value is a first frequency value, the method further comprising:
   before multiplying the first set of digital samples with the PN code to generate the first tone signal, multiplying a second set of digital samples with the PN code to generate a second tone signal;
   transforming the second tone signal to the frequency domain to generate second frequency-domain data;
   determining that the second frequency-domain data includes a second frequency component having an energy level that is at least the minimum number of standard deviations from a mean energy level of all frequency components of the second frequency-domain data; and
   determining a second frequency value of the second frequency component.

5. The method of claim 4, further comprising:
   after determining the second frequency value of the second frequency component, but before multiplying the first set of digital samples with the PN code to generate the first tone signal, multiplying a third set of digital samples with the PN code to generate a third tone signal;
   transforming the third tone signal to the frequency domain to generate third frequency-domain data;
   determining that the third frequency-domain data includes a third frequency component having an energy level that is at least the minimum number of standard deviations from a mean energy level of all frequency components of the third frequency-domain data; and
   determining a third frequency value of the third frequency component.

6. The method of claim 5, further comprising:
   before multiplying the first set of digital samples with the PN code to generate the first tone signal, determining the third frequency value equals the second frequency value.

7. The method of claim 3, wherein the frequency-domain data comprises a plurality of bins, wherein the frequency value comprises a bin number of one bin among the plurality of bins.

8. The method of claim 7, wherein decoding the encoded data from the frequency value comprises determining a bit sequence from the bin number.

9. The method of claim 3, wherein the set of digital samples is a first set of digital samples, the PN code is a first PN code, the tone signal is a first tone signal, the frequency-domain data is first frequency-domain data, the frequency component is a first frequency component, and the frequency value is a first frequency value, the method further comprising:
 before multiplying the first set of digital samples with the first PN code to generate the first tone signal, multiplying a second set of digital samples with a second PN code to generate a second tone signal; and
 transforming the second tone signal to the frequency domain to generate second frequency-domain data.

10. The method of claim 3, wherein a first portion of the encoded data is encoded in the frequency of the tone signal and a second portion of the encoded data is encoded in the phase of the tone signal.

11. The method of claim 3, wherein a first portion of the encoded data is encoded in the frequency of tone signal and a second portion of the encoded data is encoded in the amplitude of the tone signal.

12. The method of claim 9, wherein transforming the second tone signal to the frequency domain to generate second frequency-domain data comprises increasing the resolution of a Fourier transformation unit by padding the second tone signal with zeros.

13. A method, comprising:
 multiplying a first set of digital samples with a first Pseudo-Noise (PN) code to generate a first tone signal;
 transforming the first tone signal to the frequency domain to generate first frequency-domain data;
 multiplying a second set of digital samples with a second PN code to generate a second tone signal;
 transforming the second tone signal to the frequency domain to generate second frequency-domain data;
 determining that the second frequency-domain data includes a frequency component having an energy level above a threshold; and
 decoding encoded data from the frequency component.

14. The method of claim 13, further comprising:
 before multiplying the second set of digital samples with the second PN code to generate the second tone signal, determining the first frequency-domain data includes a first frequency component having an energy level above the threshold, and determining a first frequency value of the first frequency component.

15. The method of claim 13, further comprising:
 before multiplying the second set of digital samples with the second PN code to generate the second tone signal, multiplying a third set of digital samples with a third PN code to generate a third tone signal;
 transforming the third tone signal to the frequency domain to generate third frequency-domain data;
 determining that the third frequency-domain data includes a third frequency component having an energy level above the threshold; and
 determining a third frequency value of the third frequency component.

16. The method of claim 15, further comprising:
 before multiplying the second set of digital samples with the second PN code to generate the second tone signal, determining the third frequency value equals the first frequency value.

17. The method of claim 13, wherein determining the second frequency-domain data includes the second frequency component having the energy level above the threshold comprises determining that the energy level of the second frequency component is at least a minimum number of standard deviations from a mean energy level of all frequency components of the second frequency-domain data.

18. The method of claim 13, wherein a first portion of the encoded data is encoded in the frequency of the second tone signal and a second portion of the encoded data is encoded in the phase of the second tone signal.

19. The method of claim 13, wherein a first portion of the encoded data is encoded in the frequency of second tone signal and a second portion of the encoded data is encoded in the amplitude of the second tone signal.

20. The method of claim 13, wherein decoding the encoded data from the frequency component comprises:
 determining a frequency value of the frequency component, wherein the frequency value comprises a bin number of one bin among a plurality of bins; and
 decoding the encoded data from the frequency value by determining a bit sequence from the bin number.

\* \* \* \* \*